United States Patent
Li

(10) Patent No.: US 8,050,329 B2
(45) Date of Patent: Nov. 1, 2011

(54) METHOD AND APPARATUS FOR GENERIC SCALABLE SHAPE CODING

(75) Inventor: Shipeng Li, Princeton, NJ (US)

(73) Assignee: MediaTek Inc. (TW)

( * ) Notice: Subject to any disclaimer, the term of this patent is extended or adjusted under 35 U.S.C. 154(b) by 1872 days.

(21) Appl. No.: 09/312,797

(22) Filed: May 17, 1999

(65) Prior Publication Data

US 2002/0051488 A1    May 2, 2002

Related U.S. Application Data

(60) Provisional application No. 60/090,815, filed on Jun. 26, 1998, provisional application No. 60/103,012, filed on Oct. 5, 1998.

(51) Int. Cl.
*H04N 7/12* (2006.01)

(52) U.S. Cl. ............................... 375/240.26

(58) Field of Classification Search ............ 375/240.01, 375/240.02, 240.08, 240.26; *H04N 7/12*
See application file for complete search history.

(56) References Cited

U.S. PATENT DOCUMENTS

| | | | |
|---|---|---|---|
| 5,748,786 A | 5/1998 | Zandi et al. | 382/240 |
| 5,748,789 A | 5/1998 | Lee et al. | 382/243 |
| 5,751,859 A | 5/1998 | Howard | 382/238 |

FOREIGN PATENT DOCUMENTS

WO     WO 97 50253 A    12/1997

OTHER PUBLICATIONS

Mallat, Stephane, "Wavelets for a Vision", 1966, Proceedings of the IEEE, vol. 84, No. 4, Apr. 1996, pp. 604-614.*
Bossen F et al: "A Simple and Efficient Binary Shape Coding Technique Based on Bitmap Representation" 1997 IEEE International Conference on Acoustics, Speech, and Signal Processing, Multidimensional Signal Processing, Neural Networks Munich, Apr. 21-24, 1997 vol. 4, Apr. 21, 1997, pp. 3129-3132, XP000788047 Institute of Electrical and Electronics Engineers ISBN: 0-8186-7920-4 paragraph '0004!
Qian R J et al: "Content-Scalable Shape Representation and Coding" Proceedings. International Conference on Image Processing, vol. 2, Oct. 26, 1997, pp. 819-822, XP002070925 paragraph '0003!
Brady N et al: "Context-Based Arithmetic Encoding of 2D Shape Sequences" Proceedings. International Confreence on Image Processing, Oct. 26, 1997, pp. 29-32, XP002065471 paragraph '0003!

(Continued)

*Primary Examiner* — Young Lee
(74) *Attorney, Agent, or Firm* — The Law Offices of Andrew D. Fortney; Andrew D. Fortney; Anthony R. Jimenez

(57) ABSTRACT

A generic spatially-scalable shape encoding apparatus and method for handling different mask decomposition methods, while maximizing coding efficiency of the encoder, is disclosed. The present generic spatially-scalable shape encoding applies three encoding steps to maximize the coding efficiency of the encoder, i.e., mask mode encoding, base mask layer coding and enhancement mask layer coding.

26 Claims, 11 Drawing Sheets

OTHER PUBLICATIONS

Noboru Yamaguchi et al: "A Binary Shape Coding Method Using Modified MMR" Proceedings of the International Conference on Image Processing ICIP 1997, Santa Barbara, CA Oct. 26-29, 1997, vol. 1, Oct. 26, 1997, pp. 504-507, XP000792822 Institute of Electrical and Electronics Engineers ISBN: 0-8186-8184-5 abstract paragraph '02.4!

PCT International Search Report corresponding to PCT application PCT/US99/14509.

Li et al "Proposal for a generic scalable shape coding scheme based on CAE" ISO/IEC JTC1/SC29/WG11/M3787, Dublin, pp. 1-10, Jul. 1998.

Li et al "Shape Adaptive Discrete Wavelet Transforms for Arbitrarily Shaped Visual Object Coding", *Lehigh University, Department of EECS*, pp. 1-25.

* cited by examiner

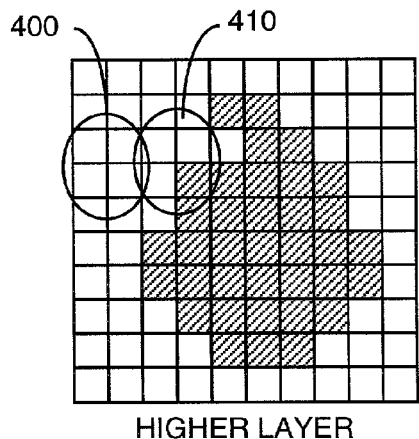 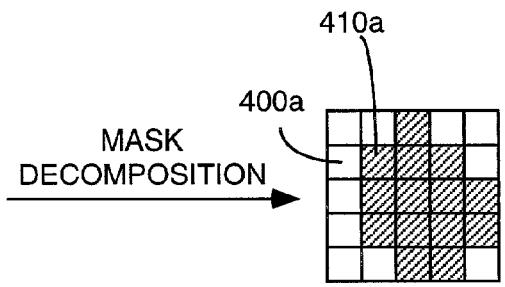
FIG. 4  HIGHER LAYER → MASK DECOMPOSITION → LOWER LAYER
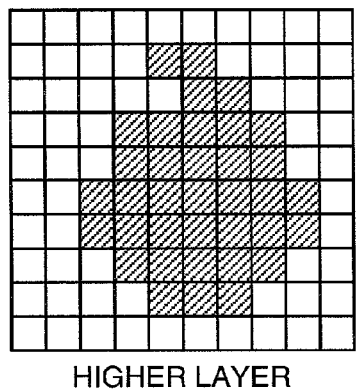 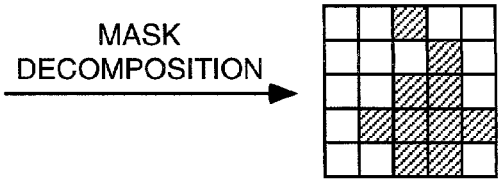
FIG. 5  HIGHER LAYER → MASK DECOMPOSITION → LOWER LAYER
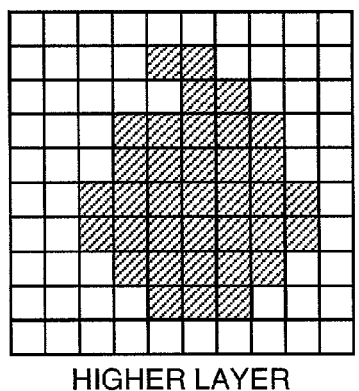 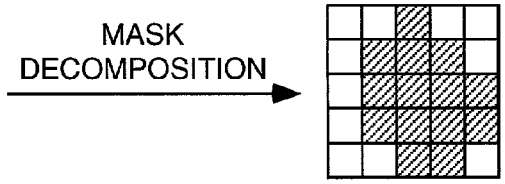
FIG. 6  HIGHER LAYER → MASK DECOMPOSITION → LOWER LAYER 1700 HALF HIGHER LAYER 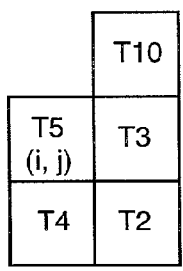
1710 CURRENT LAYER 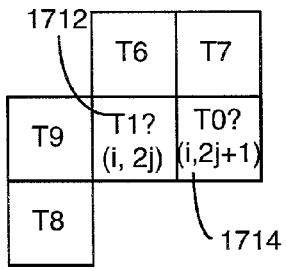
FIG. 17
1800 HALF HIGHER LAYER 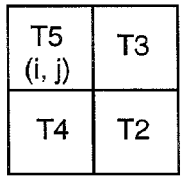
1810 CURRENT LAYER 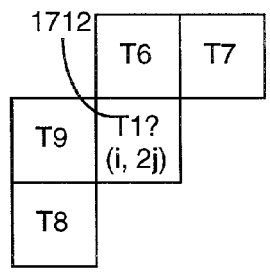
FIG. 18
1900 HALF HIGHER LAYER 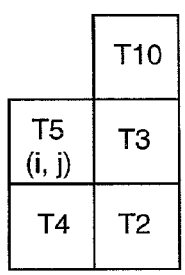
1910 CURRENT LAYER 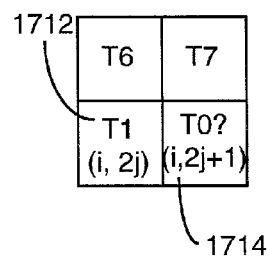
FIG. 19

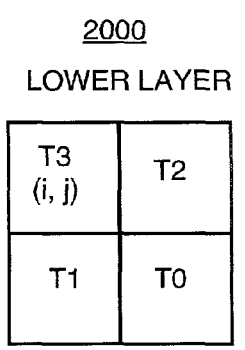 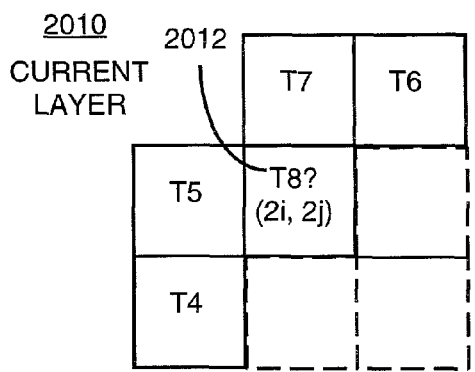
FIG. 20
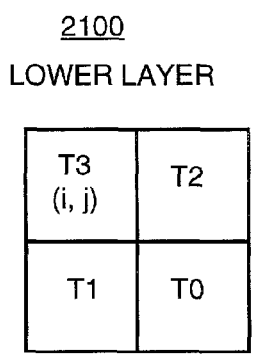 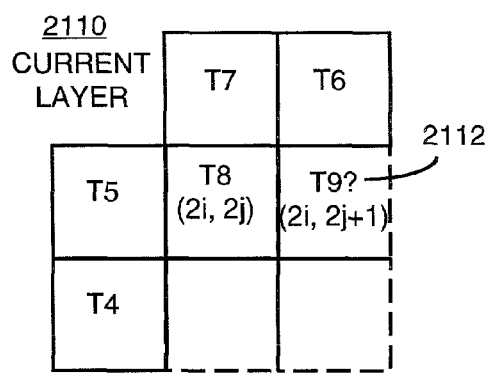
FIG. 21
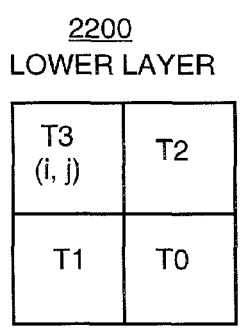 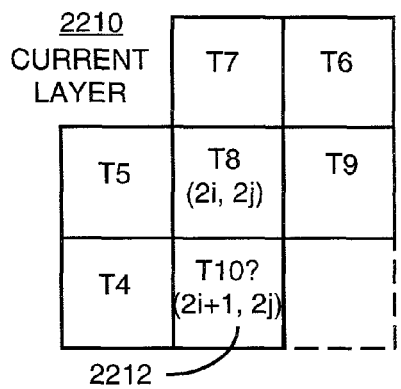
FIG. 22
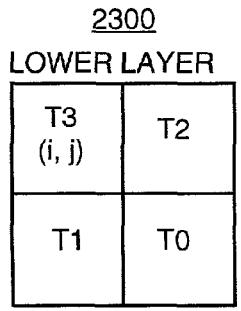 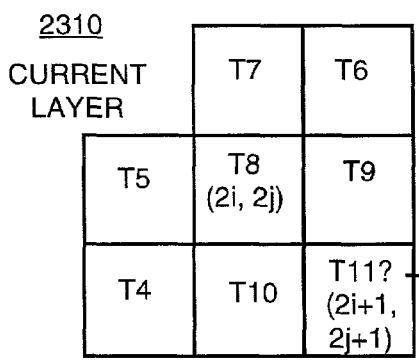
FIG. 23

METHOD AND APPARATUS FOR GENERIC SCALABLE SHAPE CODING

This application claims the benefit of U.S. Provisional Application No. 60/090,815 filed Jun. 26, 1998 and U.S. Provisional Application No. 60/103,012 filed Oct. 5, 1998, which are herein incorporated by reference.

The invention relates to an apparatus and a concomitant method for shape or object mask coding. More particularly, the invention relates to a method for increasing the efficiency of scalable shape coding by correlating the coding of the mask of the object between different scales.

BACKGROUND OF THE INVENTION

Shape or object mask encoding (also known as object-oriented image and video coding) has gained acceptance and is presently being promoted to various multimedia standards, e.g., the MPEG-4 (Moving Picture Experts Group) international standard. However, unlike traditional frame encoding methods, each frame or picture is considered as consisting of one or more flexible objects (objects having arbitrary shapes), that may undergo changes such as translations, rotations, scaling, brightness and color variations and the like. Using shape or object mask encoding, functionalities are not only provided at the frame level, but also at the object level.

One functionality is scalability, i.e., providing an image at different spatial resolutions. In general, shape encoding starts by segmenting an image frame into a plurality of objects or video object planes (VOPs), e.g., a speaker in an image is one object and the background is a second object. The resulting "shape information" can be represented as a "binary mask". A mask can be broadly defined as the information that defines the shape of an object or pixels associated with an object. Since the object mask is tracked and encoded into the bitstream, it is possible to provide various functionalities based on object.

More specifically, the shape information or object mask is used to indicate the arbitrary shape of an image or video object and the region in which the texture of this object needs to be coded. The binary shape information provides object mask with only two values: transparent or opaque (where transparent means the corresponding pixel is outside of an object and opaque means the corresponding pixel is within the object). FIG. 1(a) shows such an arbitrary shaped object 100 and FIG. 1(b) shows the corresponding binary object mask 110 that identifies the shape and texture region of the object. Although the arbitrary shaped object 100 contains specific texture information, illustrated by the different gray-scale shading, such specific texture information is not captured by the object mask. Only the shape information and whether a pixel is within or without an object is provided by the object mask.

When scalability is required, the mask (i.e., shape of the object) is typically decomposed into a plurality of different spatial resolutions (levels of resolution), such that the encoder will also encode the mask at different spatial resolutions into the encoded bitstream. However, since numerous decompositions methods are available, the encoding efficiency of the encoder varies depending on the decomposition method that is employed. Additionally, if the decomposition method is modified, it is often necessary or desirable to also alter the mask encoding method to better match the decomposition method, thereby increasing overall coding efficiency. Unfortunately, such modification to the encoder is costly, complex, and time consuming.

Therefore, a need exists in the art for a generic spatially-scalable shape encoding method and apparatus that is capable of handling different decomposition methods, while maximizing coding efficiency of the encoder.

SUMMARY OF THE INVENTION

In the present invention, an embodiment of a generic spatially-scalable shape encoding apparatus and concomitant method for handling different mask decomposition methods, while maximizing coding efficiency of the encoder, is disclosed. The present generic spatially-scalable shape encoding applies three encoding steps to maximize the coding efficiency of the encoder, i.e., mask mode encoding, base mask layer coding and enhancement mask layer coding.

More specifically, an image frame (top level) having at least one object is initially segmented into a plurality of blocks or regions. For the purpose of mask generation, each block is assigned a mode or symbol to indicate whether it is "opaque", "transparent" or "border". The modes for the entire top level mask is then encoded into the bitstream.

In turn, the top level mask is decomposed into a plurality of mask layers or mask levels using any shape or mask decomposition methods. The lowest mask layer, i.e., base mask layer, is then encoded into the bitstream.

Next, mask layers that are above the base layer are then hierarchically and/or contextually encoded using information from an immediate lower mask layer. Namely, each layer or "enhancement mask layer" is encoded using information that is derived from a mask layer that is immediately below the present mask layer of interest. In this manner, a generic spatially-scalable shape encoding apparatus and concomitant method is provided that is capable of handling different shape or mask decomposition methods, while maximizing coding efficiency of the encoder.

BRIEF DESCRIPTION OF THE DRAWINGS

The teachings of the present invention can be readily understood by considering the following detailed description in conjunction with the accompanying drawings, in which:

FIG. 4 illustrates a block diagram of the correlation between a higher mask layer and its corresponding decomposed lower mask layer via decomposition by OR-ING decision;

FIG. 5 illustrates a block diagram of the correlation between a higher mask layer and its corresponding decomposed lower mask layer via decomposition by odd symmetric filters;

FIG. 6 illustrates a block diagram of the correlation between a higher mask layer and its corresponding decomposed lower mask layer via decomposition by even symmetric filters;

FIG. 17 illustrates a block diagram of the relative positions of context elements for a second pass enhancement layer coding;

FIG. 18 illustrates a block diagram of the relative positions of context elements in enhancement layer coding for encoding a first pixel in the current spatial layer;

FIG. 19 illustrates a block diagram of the relative positions of context elements in enhancement layer coding for encoding a second pixel in the current spatial layer;

FIG. 20 illustrates a block diagram of the relative positions of context elements for enhancement layer coding using a binary context model for a first pixel $A(2i,2j)$;

FIG. 21 illustrates a block diagram of the relative positions of context elements for enhancement layer coding using a binary context model for a second pixel $A(2i,2j+1)$;

FIG. 22 illustrates a block diagram of the relative positions of context elements for enhancement layer coding using a binary context model for a third pixel $A(2i+1,2j)$;

FIG. 23 illustrates a block diagram of the relative positions of context elements for enhancement layer coding using a binary context model for a fourth pixel $A(2i+1,2j+1)$;

To facilitate understanding, identical reference numerals have been used, where possible, to designate identical elements that are common to the figures.

DETAILED DESCRIPTION

Figure 1:
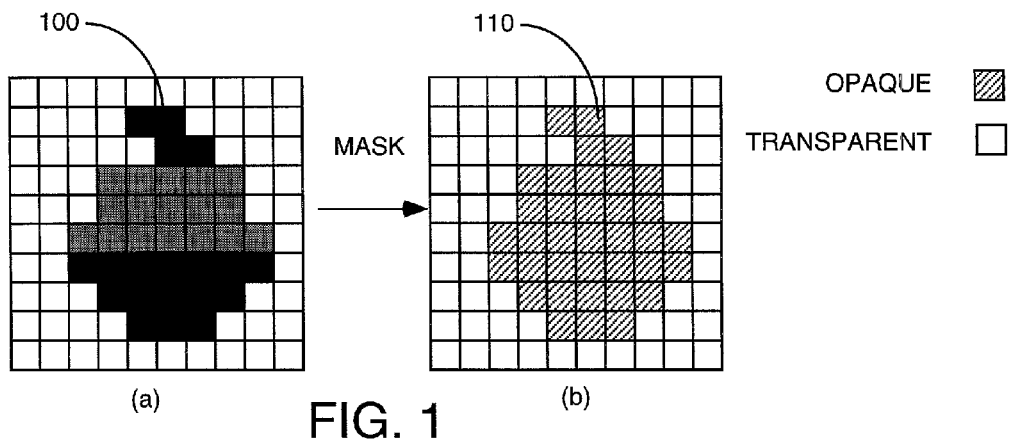
FIG. 1 illustrates a block diagram of the correlation between an arbitrary shaped object and its corresponding object mask.

Shape coding is an important part of object-oriented image and video coding. The shape information or object mask is used to indicate the wits arbitrary shape of an image or video object and the region in which the texture of this object needs to be coded. The shape information (e.g., binary shape information) provides object mask with only two values: transparent or opaque (where transparent means the corresponding pixel is outside of an object and opaque means the corresponding pixel is within the object) as discussed above in FIG. 1.

For applications that do not require spatial scalability, a standard non-scalable binary shape coding is an effective method for encoding the object mask. However, some standards, such as MPEG-4, have also adopted the standard binary shape coding to object-oriented video coding. Since the standard binary shape coding method is not spatially scalable, the decoder needs to retrieve an undesirable amount of extra information in order to properly decode a scaled version of the original full-resolution frame, regardless of the spatial level or spatial resolution. In other words, the encoder must transmit the full-resolution shape information to the decoder and the decoder must decode the full-resolution shape information to obtain the correct full-resolution object mask. Then, the decoder must first decompose the full-resolution object mask into masks at different spatial resolutions before it can correctly decode the coded coefficients in the bitstream for a desired scaled version of the original full-resolution frame. Unfortunately, this would require both more transmission bandwidth and decoding time.

Figure 2:
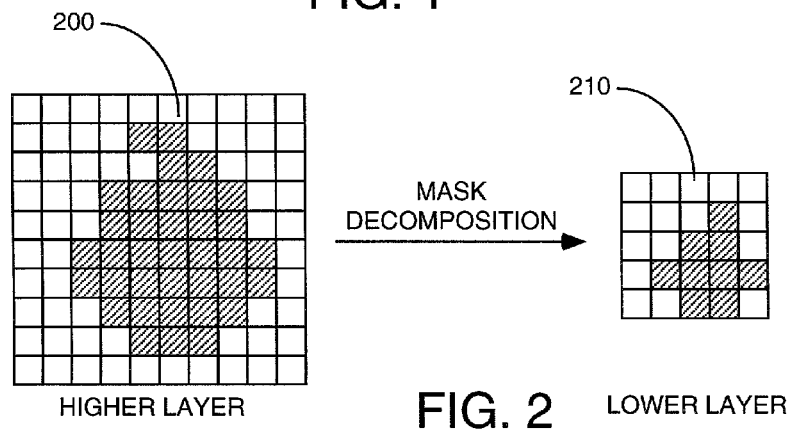
FIG. 2 illustrates a block diagram of the correlation between a higher mask layer and its corresponding decomposed lower mask layer via decomposition by subsampling.

Furthermore, the shape (or mask) decomposition schemes that generate different spatial layers of mask may vary from application to application. For example, in some applications, each lower layer can be achieved by subsampling of every other pixel in both horizontal and vertical directions of the rectangular mask in a higher layer as shown in FIG. 2. Namely, a higher mask layer 200 is decomposed into a lower mask layer 210 by sampling in both directions by a factor of two.

Figure 3:
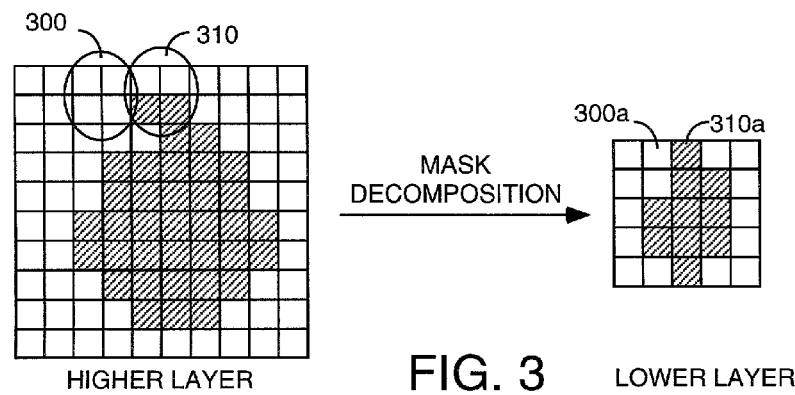
FIG. 3 illustrates a block diagram of the correlation between a higher mask layer and its corresponding decomposed lower mask layer via decomposition by majority decision.

Alternatively, FIG. 3 illustrates a block diagram of a mask decomposition that is based on majority decision. Namely, the lower layer of mask is formed by setting the mask value of the each pixel to that of the majority of the pixels in the 2×2 region in a higher layer. For example, a 2×2 region 300 has four transparent pixels, thereby generating a single transparent pixel 300*a* in the lower mask layer. In contrast, a 2×2 region 310 has two transparent pixels and two opaque pixels, thereby generating a single opaque pixel 310*a* in the lower mask layer, where the majority rule in this example defines an opaque pixel for the condition where two or more pixels are opaque in the corresponding higher mask level.

Alternatively, FIG. 4 illustrates a block diagram of a mask decomposition that is based on "OR-ing" decision. Namely, the mask value of each pixel in the lower layer is set to opaque whenever there is at least an opaque pixel in the corresponding 2×2 region in a higher layer. For example, a 2×2 region 400 has four transparent pixels, thereby generating a single transparent pixel 400*a* in the lower mask layer. In contrast, a 2×2 region 410 has three transparent pixels and one opaque pixel, thereby generating a single opaque pixel 410*a* in the lower mask layer, where the OR-ing rule in this example defines an opaque pixel in the lower mask layer for the condition where at least one pixel is opaque in the corresponding higher mask layer.

Furthermore, for the arbitrary shape wavelet coding method adopted in the MPEG-4 standard, two additional mask decomposition methods are proposed, which correspond to two different filter types: "odd symmetric filters" and "even symmetric filters". For both types of filters, the mask decomposition is achieved by performing horizontal and vertical 1-D mask decomposition.

FIG. 5 illustrates a block diagram of a mask decomposition that is based on odd symmetric filters. More specifically, for the odd symmetric filters case, the 1-D decomposition begins by subsampling every even position mask value into low subband and every odd position mask value into high subband. If there is an isolated pixel at the odd position, then the mask values at the corresponding position at low subband and high subband are swapped.

FIG. 6 illustrates a block diagram of a mask decomposition that is based on even symmetric filters. More specifically, for the even symmetric filters case, the 1-D decomposition begins by subsampling every even position mask value into low subband and every odd position mask value into high subband. If a segment starts at odd position, then the mask values at the start position at low subband and high subband are swapped.

As discussed above, since numerous decomposition methods are available, the encoding efficiency of the encoder varies depending on the decomposition method that is employed. Additionally, if the decomposition method is modified, it is often necessary or desirable to also alter the mask encoding method to better match the decomposition method, thereby increasing overall coding efficiency. Thus, it is desirable to have a generic scalable shape mask coding method that is capable of handling any decomposition method, including but not limited to, all the decomposition methods mentioned above in a generic manner. Moreover, the mask decomposition method used should correspond to the specific decomposition method used for texture coding to obtain true scalability.

In the present invention, a new generic spatially-scalable shape coding method is disclosed that is independent of the mask decomposition scheme. It has been observed that the present scalable shape coding method has better overall coding efficiency than the non-scalable coding scheme adopted in the current proposed MPEG-4 standard.

Figure 12:
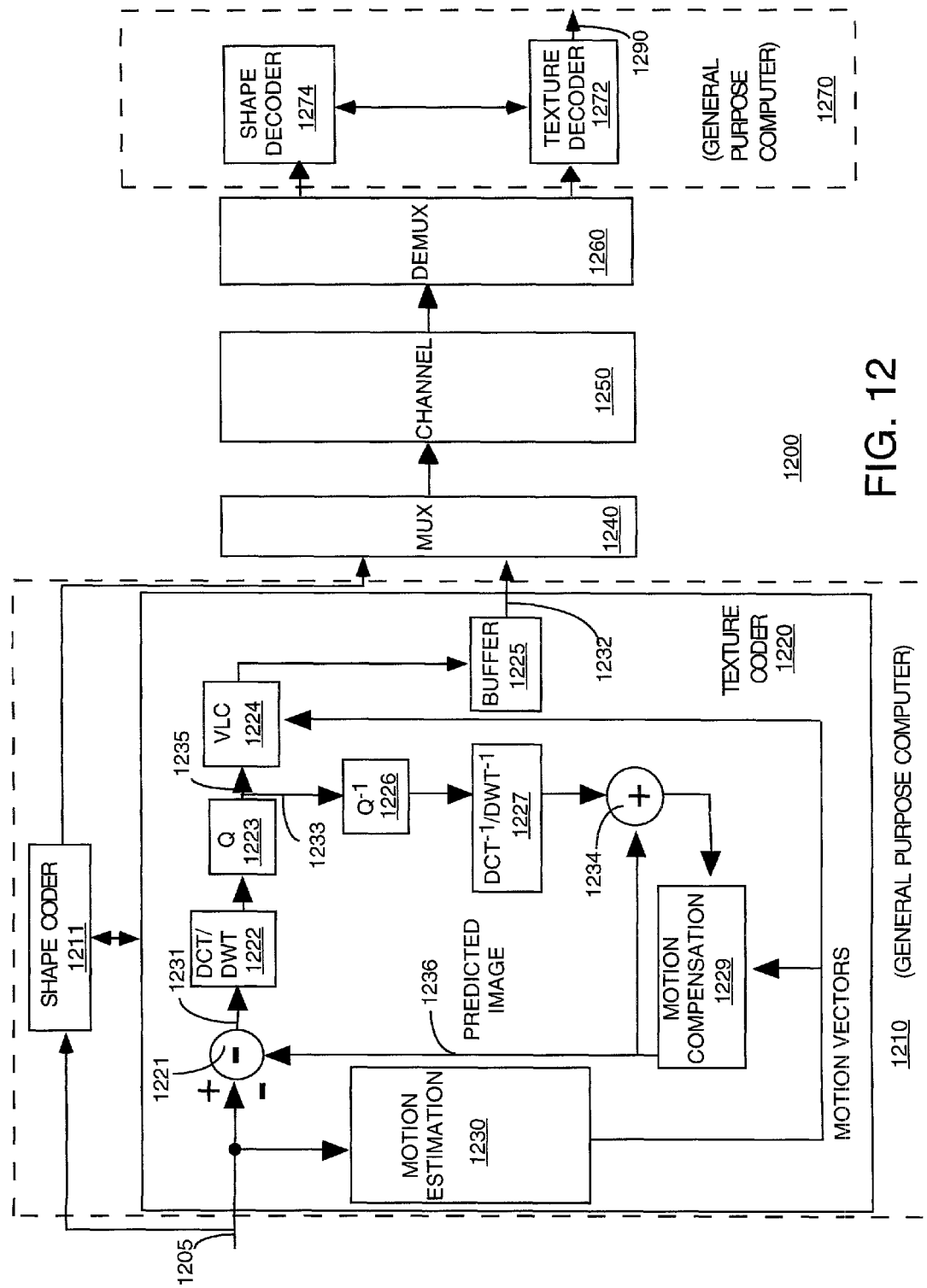
FIG. 12 illustrates a block diagram of an encoding and decoding system of the present invention.

FIG. 12 illustrates a coding and decoding system 1200 of the present invention. The present coding and decoding system 1200 comprises an encoder 1210 and a decoder 1270. In the preferred embodiment, the encoder 1210 comprises a shape coder 1211 and a texture coder 1220. The shape coder 1211 is tasked with generating and coding the shape information, e.g., object mask, whereas the texture coder 1220 is tasked with the encoding of the luminance and chrominance variations of the regions bounded by the object mask.

More specifically, input image signal is received on path 1205 by both coders 1211 and 1220. The input image signal can be an input video image (image sequence) which is digitized and represented as a luminance and two color difference signals.

The shape coder 1211 operates to extract shape information from the input image, e.g., detecting one or more objects, generating object masks, decomposing object masks, and/or coding of object masks. As such, the present generic spatially-scalable shape coding method is implemented in shape coder 1211. It should be noted that the input image signal may already contain "object based" information, such that one or more shape processing steps can be omitted. For example, if the input image signal contains VOP information, segmentation processing can be omitted since the objects are already defined for the shape coder 1211.

The texture coder 1220 may comprise a motion estimation module 1230, a motion compensation module 1229, a transform module (discrete cosine transform (DCT) or discrete wavelet transform (DWT)) 1222, a quantization (Q) module 1223, an entropy coding module 1224, e.g., variable length coding (VLC) module, a buffer 1225, an inverse quantization ($Q^{-1}$) module 1226, an inverse transform ($DCT^{-1}$ or $DWT^{-1}$) transform module 1227, a subtractor 1221 and a summer 1234. It should be noted that the texture coder 1220 is illustrated as an example and the present invention is not limited to any particular texture coder.

In operation, the input image signal is received into motion estimation module 1230 for estimating motion vectors. In fact, the motion estimation module 1230 may utilize the shape information received from the shape coder in its motion estimation processing. The motion vectors are received by the motion compensation module 1229 for generating a prediction that uses motion vectors to provide offsets into the past and/or future reference frames containing previously decoded sample values that are used to form the prediction error.

A motion compensated prediction (predicted image) is generated on path 1236 and is subtracted via subtractor 1221 from the input image on path 1205 to form an error signal or predictive residual signal on path 1231. A spatial transform module 1222 is then applied to generate transform coefficients which can be manipulated for the purpose of removing spatial redundancy.

The resulting transform coefficients are received by quantization module 1223 where the transform coefficients are quantized. Next, the resulting quantized coefficients are received by variable length coding (VLC) module 1224 via signal connection 1235, where the quantized coefficients are entropy coded and are received into a "First In-First Out" (FIFO) buffer 1225 for transmission or storage.

Additionally, the resulting quantized coefficients from the quantization module 1223 are also received by the inverse quantization module 1226 via signal connection 1233. The resulting dequantized coefficients are passed to the inverse transform module 1227 where inverse transform is applied to produce the decoded error signal. This error signal is added back to the prediction signal from the motion compensation module via summer 1234 to produce a decoded reference picture (reconstructed image).

The encoded bitstreams from coders 1211 and 1220 are then received and multiplexed by the transport stream multiplexer 1240 to produce a transport stream. The transport stream is transmitted over a communication channel 1250, which may further incorporate separate channel specific encoder and decoder (not shown). Next, the transport stream is demultiplexed and decoded by a transport stream demultiplexor 1260, where the elementary streams serve as inputs to video decoder 1270, whose output is a decoded video signal on path 1290.

It should be noted that although the present invention is described below with respect to an encoding method and apparatus, a corresponding and complementary decoding process is performed via a complementary set of a shape decoder 1274 and a texture decoder 1272.

Furthermore, FIG. 12 illustrates the present encoder 1210 and decoder 1270 as capable of being implemented within a general purpose computer having various input/output devices, e.g., a keyboard, a mouse, an audio recorder, a camera, a camcorder, a video monitor, any number of imaging devices or storage devices, including but not limited to, a tape drive, a floppy drive, a hard disk drive or a compact disk drive (not shown). Namely, the general purpose computer may comprise a central processing unit (CPU) (not shown), a memory (not shown) and the encoder 1210 for encoding an image, video and/or audio signal in accordance with the methods described below.

The encoder 1210 can be a physical device, which is coupled to the CPU through a communication channel. Alternatively, the encoder 1210 can be represented by a software application (or a combination of software and hardware, e.g., using application specific integrated circuits (ASIC)), where the software is loaded from a storage medium, (e.g., a magnetic or optical drive or diskette) and operated by the CPU in the memory of the computer. As such, the encoder itself and the methods executed by the encoder of the present invention can be stored on a computer readable medium.

Similarly, the decoder 1270 can also be a physical device, which is coupled to the CPU through a communication channel. Alternatively, the decoder 1270 can be represented by a software application (or a combination of software and hardware, e.g., using application specific integrated circuits (ASIC)), where the software is loaded from a storage medium, (e.g., a magnetic or optical drive or diskette) and operated by the CPU in the memory of the computer. As such, the decoder itself and the methods executed by the decoder of the present invention can also be stored on a computer readable medium.

Figure 10:
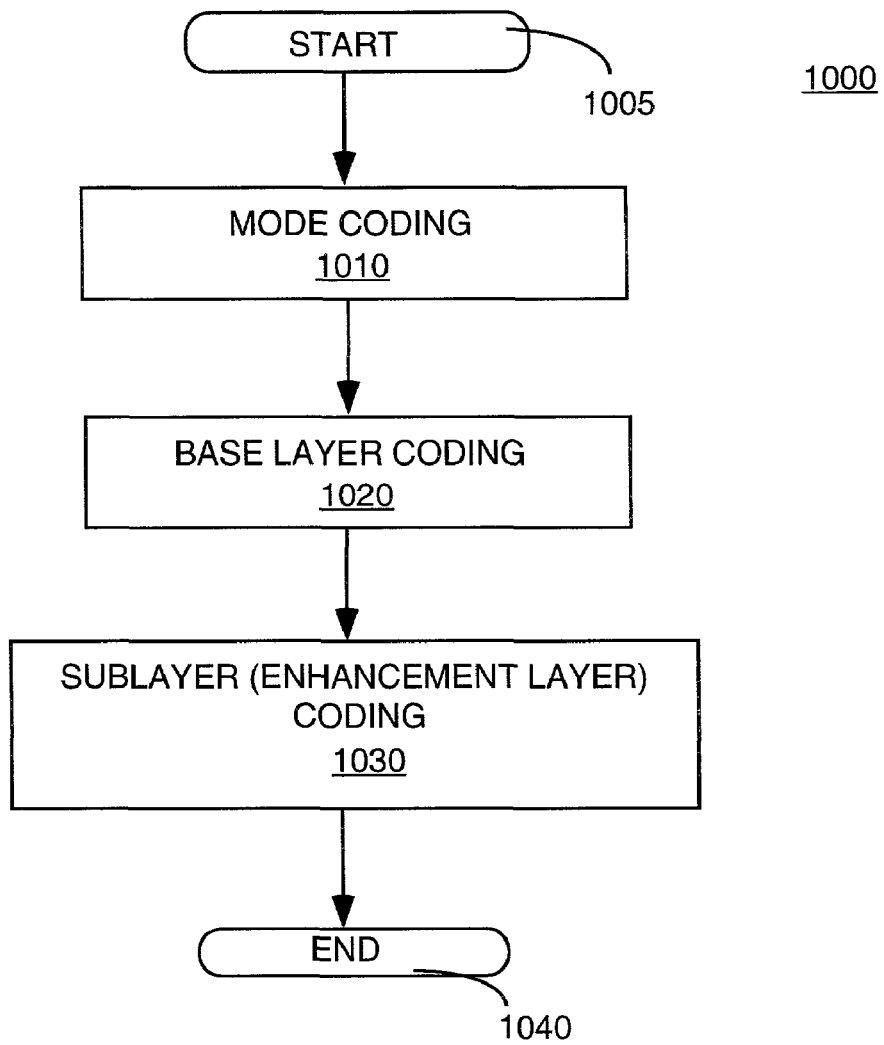
FIG. 10 illustrates a flowchart of a method for shape or mask encoding of the present invention.

FIG. 10 illustrates a top level flowchart of a generic shape or mask encoding method 1000 of the present invention. The method 1000 starts in step 1005 and proceeds to step 1010 where mode coding is applied to the shape or object mask.

More specifically, in step 1010, a full-resolution image frame having at least one object is initially segmented into a plurality of blocks or regions. Although the terms "block" and "region" are specifically defined below in different embodiments, it should be understood that these terms can be interpreted broadly in this specification to be as small as a single pixel or as large as the entire input image frame. For the purpose of mask generation, each block is assigned a mode or symbol to indicate whether it is "opaque", "transparent" or "border". The modes for the entire mask are then encoded into the bitstream.

In step 1020, method 1000 decomposes the "top level" or full-resolution mask into a plurality of layers or mask levels using any shape or mask decomposition methods, e.g., any of the decomposition methods as discussed above in FIGS. 2-6. The lowest mask layer, i.e., "base mask layer", is then encoded into the bitstream in step 1020.

In step 1030, method 1000 hierarchically and contextually encodes mask layers that are above the base mask layer by using information from an immediate lower mask layer. Namely, each layer above the base mask layer (or "enhancement mask layer") is encoded using information that is derived from a mask layer that is immediately below the present mask layer of interest. In this manner, a generic spatially-scalable shape encoding method is provided that is capable of handling different shape or mask decomposition methods, while maximizing coding efficiency of the encoder.

Figure 11:
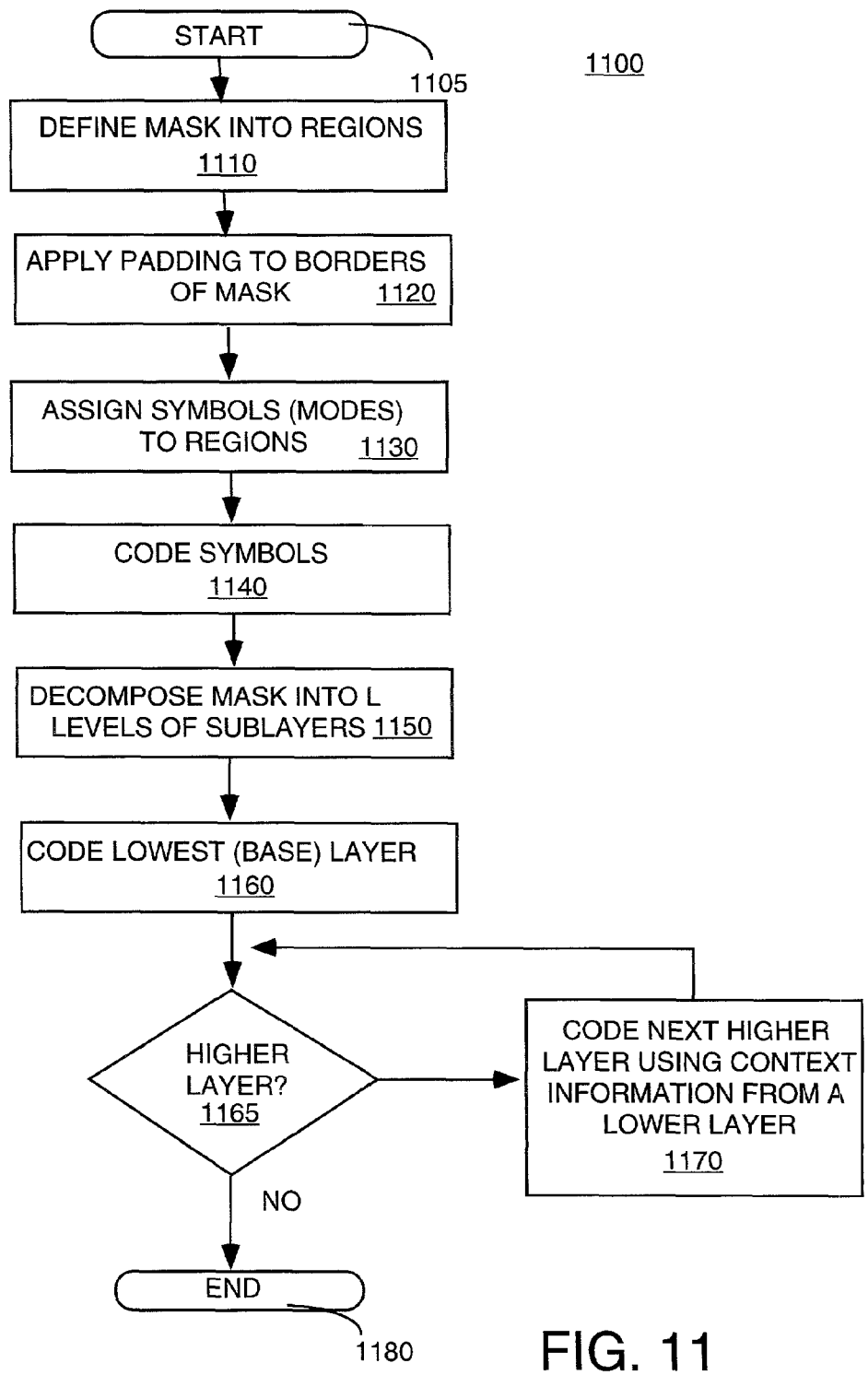
FIG. 11 illustrates a flowchart of a detailed method for shape or mask encoding of the present invention.

The present invention is now described in detail below with reference to FIGS. 7, 8, 9 and 11. FIG. 11 illustrates a flowchart of a detailed method 1100 for generic spatially scalable shape or mask encoding, that is independent of the shape decomposition method.

Method 1100 starts in step 1105 and proceeds to step 1110, where an object mask is divided or defined in accordance with a plurality of blocks or regions. Assume "L" levels of mask decomposition is to be performed on the original input or full-resolution object mask. Then, method 1100 divides the object mask into blocks of $2^N \times 2^N$ pixels, where N is equal to or greater than L.

In step 1120, if the size of the object mask is not multiples of $2^N$, then method 1100 may pad the object mask with zeros in the proper direction(s) to make the object size multiples of $2^N$.

In step 1130, method 1100 assigns mask symbols or modes to each of the blocks. Namely, for each block of $2^N \times 2^N$ pixels, if all its pixels have mask values of 1's, then method 1100 marks the block with symbol "ALL-Opaque" (mode=1). If all its pixels have mask values of 0's, then method 1100 marks the block with symbol "ALL-Transparent" (mode=0). Otherwise, method 1100 marks the block with symbol "Border" (mode=2), i.e., the block contains both 1's and 0's indicating the border of an object.

Figure 7:
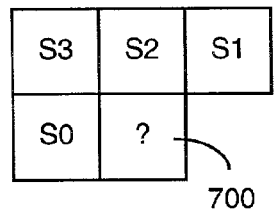
FIG. 7 illustrates a block diagram of the relative positions of context elements for block mode coding.

In step 1140, method 1100 then encodes the mask symbols. In the preferred embodiment, each of these block modes or symbols ($M_{ij}$) is encoded using context-based arithmetic coding based on the following context:

$$\text{context}_0 = S_3 * 27 + S_2 * 9 + S_1 * 3 + S_0, \quad (1)$$

where $\text{context}_0$ is the context for the current block mode to be coded, $S_3 = M_{(i-1)(j-1)}$, $S_2 = M_{(i-1)j}$, $S_1 = M_{(i-1)(j+1)}$, $S_0 = M_{i(j-1)}$, and i and j are the row index and column index of the blocks, respectively. Namely, using contexts as defined by equation (1) to switch a variable length code table to encode the current mode. If any of the context element is outside the rectangular mask, ALL-Transparent symbol is used to replace it. To clarify the context elements of equation (1), FIG. 7 illustrates the context construction, where the block 700 with a question mark indicates the block whose mode is to be encoded.

Alternatively, in step 1140, method 1100 can encode the mode for the block ($M_{ij}$) using binary context-based arithmetic coding method. Namely, the 3-ary block mode symbol is first decomposed into binary symbol(s). Binary variables class and type are used to represent a 3-ary block mode.

More specifically, the three mode symbols are classified into 2 classes: "Uniform" (All-Transparent, and All-Opaque) Or "Non-uniform" (Border). If the symbol belongs to the Uniform class, additional type information is used to differentiate All-Transparent or All-Opaque modes. The additional information "type" has two possible values: Transparent (0) or Opaque (1). If the symbol belongs to the Non-uniform class, no additional information in needed. The mode symbol can then be represented as:

$$S = (\text{class} == \text{UNIFORM})? ((\text{type} == \text{TRANSPARENT})?\ 0:1):2 \quad (1a)$$

The binary variables class and type are then encoded using the same binary arithmetic coder as discussed above with the context as described in equation (1). Specifically, two context based binary probability models for "class" and "type", respectively can be employed. For each mode symbol, the "class" is first encoded using a binary arithmetic coder. If the "class" is "Uniform", then "type" is also coded using a binary arithmetic coder with the corresponding probability model. If the "class" is "Nonuniform", then the current mode symbol coding is finished and the encoder will proceed to the next mode symbol for the next block. Table A-I(a) and Table A-I(b) in the Appendix provide the context based probability tables for the variables "class" and "type", respectively.

Returning to FIG. 11, in step 1150, method 1100 decomposes the full-resolution or input object mask into a plurality of mask layers. Namely, any desired mask decomposition scheme can be used to decompose the object mask into L levels of spatial layers.

For example, in one embodiment, denote each layer as $\Lambda_n$, where $0<=n<=L$. $\Lambda_0$ denotes the full resolution object mask and $\Lambda_L$ denotes the base mask layer (lowest spatial layer). For each layer, mark all pixels corresponding to the ALL-Transparent or ALL-Opaque blocks as "Not-Coded" since its value can be easily filled according to the block mode, and mark all other pixels to "To-Be-Coded".

Figure 8:
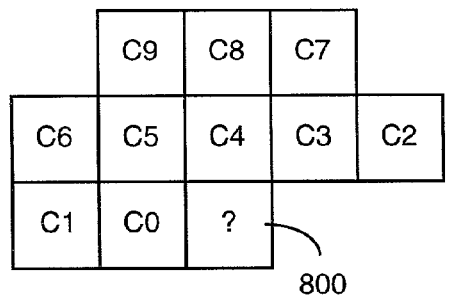
FIG. 8 illustrates a block diagram of the relative positions of context elements for base layer coding.

In step 1160, method 1100 encodes the base mask layer. More specifically, for the base mask layer (lowest spatial layer), the mask value ($m^L_{ij}$) of pixels marked as "To-Be-Coded" are encoded in raster scan order, using context based arithmetic coding. The context can be constructed as follows:

$$context_1=(C_9<<9)|(C_8<<8)|(C_7<<7)|(C_6<<6)|(C_5<<5)|(C_4<<4)|(C_3<<3)|(C_2<<2)|(C_1<<1)|C_0 \quad (2)$$

where "<<" is a left-shift operation and "|" is a bit wise logical OR operation, $C_9=m^L_{(i-2)(j-1)}$, $C_8=m^L_{(i-2)j}$, $C_7=m^L_{(i-2)(j+1)}$, $C_6=m^L_{(i-1)(j-2)}$, $C_5=m^L_{(i-1)(j-1)}$, $C_4=m^L_{(i-1)j}$, $C_3=m^L_{(i-1)(j+1)}$, $C_2=m^L_{(i-1)(j+2)}$, $C_1=m^L_{i(i-2)}$, $C_0=m^L_{i(j-1)}$, $context_1$ is the context for the current base-layer mask value to be coded, i and j denotes the current row and column indices of the mask value to be coded. In the case where the position of a context element ($C_k$) is outside the lowest layer's rectangular boundary, $C_k$ is always set to zero in the construction of the context. To clarify the context elements of equation (2), FIG. 8 illustrates the context construction, where the pixel 800 with a question mark indicates the base-layer mask value to be encoded.

In step 1165, method 1100 queries whether a higher mask layer needs to be coded. If the query is positively answered, then method 1100 proceeds to step 1170. If the query is negatively answered, then method 1100 ends in step 1180.

In step 1170, method 1100 encodes the next mask layer, i.e., enhancement layer coding. More specifically, method 1100 employs hierarchical and contextual encoding, where the mask of each spatial layer $\Lambda_n$ is encoded in accordance with the previous lower spatial layer $\Lambda_{n+1}$, where $0<=n<L$.

Namely, for each 2×2 non-overlapped subblock, $V^n$, in the spatial layer $\Lambda_n$ that is marked "To-Be-Coded", form a variable that have 16 different values as follows:

$$V^n=m^n_{(2i)(2j)}*8+m^n_{(2i)(2j+1)}*4+m^n_{(2i+1)(2j)}*2+m^n_{(2i+1)(2j+1)} \quad (3)$$

where i and j are row and column indices which this 2×2 subblock corresponding to in the previous lower spatial layer $\Lambda_{n+1}$. $V^n$ is then encoded using context-based arithmetic coding. The context of the arithmetic coder can be constructed as follows:

$$context_2=(T_7<<7)|(T_6<<6)|(T_5<<5)|(T_4<<4)|(T_3<<3)|(T_2<<2)|(T_1<<1)|(T_0) \quad (4)$$

where "<<" is a left-shift operation and "|" is a bit wise logical OR operation, $T_7=m^n_{(2i-1)(2j)}$, $T_6=m^n_{(2i-1)(2j+1)}$, $T_5=m^n_{(2i)(2j-1)}$, $T_4=m^n_{(2i+1)(2j-1)}$, $T_3=m^{n+1}_{(i)(j)}$, $T_2=m^{n+1}_{(i)(j+1)}$, $T_1=m^{n+1}_{(i+1)(j)}$, $T_0=m^{n+1}_{(i+1)(j+1)}$, $m^n_{(x)(y)}$ denotes the mask value at position (x,y) in spatial layer $\Lambda_n$, 910. It should be noted that in the above context, mask values from lower spatial layer $\Lambda_{n+1}$, 900, are used in the construction of the context. Again, for those context elements that are outside the layer boundary, zeros are used instead to form the context.

Figure 9:
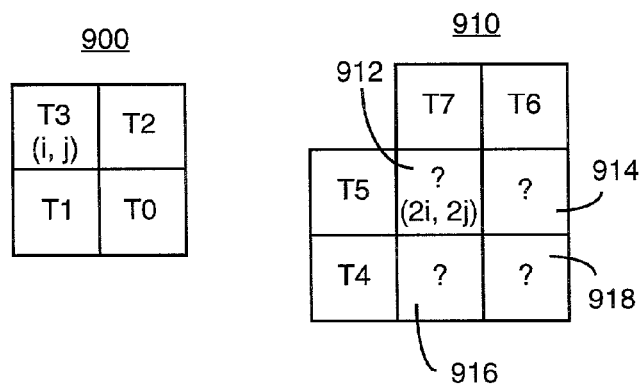
FIG. 9 illustrates a block diagram of the relative positions of context elements for enhancement layer coding.

To clarify the context elements of equation (4), FIG. 9 illustrates the context construction, where the pixels 912, 914, 916, and 918 with question marks indicate the pixels in current spatial layer $\Lambda_n$ 910 whose mask values are to be encoded. Namely, FIG. 9 illustrates the construction of this context from both the lower spatial layer $\Lambda_{n+1}$ 900 and from a current spatial layer $\Lambda_n$ 910.

Alternatively, two additional embodiments are now described below for implementing enhancement layer coding: a two-pass coding approach and a binary arithmetic coding approach. Advantages of the two-pass coding approach include its ability in supporting different wavelet filters for both horizontal and vertical directions, its simplified context models and its compatibility with the present scalable shape coding method as proposed in the MPEG-4 video object coding standard. In contrast, the binary arithmetic coding approach is advantageous in simplifying the implementation of the shape coder 1211. Thus, the implementation of the enhancement layer coding can be selected in accordance with the need of a particular application.

Two-Pass Enhancement Layer Coding

Figure 13:
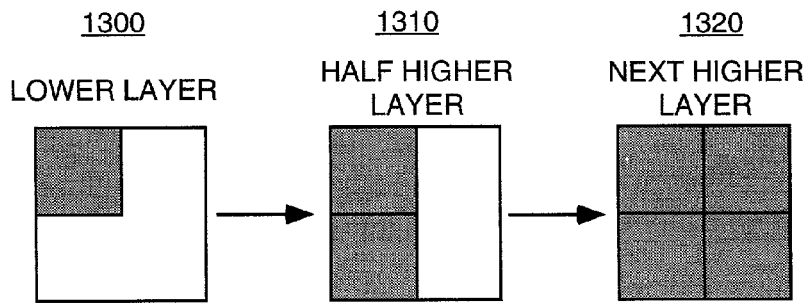
FIG. 13 illustrates a two-pass prediction-based enhancement layer coding method.

The two-pass enhancement layer coding can be implemented in step 1170, as shown in FIG. 13. In the first pass, a "half-higher" spatial layer $\Lambda_{n+\frac{1}{2}}$ 1310 is encoded based on a previous lower spatial layer $\Lambda_{n+1}$ 1300. In the second pass, the current spatial layer $\Lambda_n$ 1320 is encoded based on the half-higher spatial layer $\Lambda_{n+\frac{1}{2}}$ 1310. The half-higher spatial layer $\Lambda_{n+\frac{1}{2}}$ 1310 is defined as the lower (left) half of the mask after the horizontal analysis from the higher layer $\Lambda_n$ 1320. In other words, the half-higher spatial layer $\Lambda_{n+\frac{1}{2}}$ 1310 is the result of applying horizontal decomposition (i.e., applying filter in the horizontal direction only), where the left half of the results would be the horizontal low pass.

It should be noted that since the present invention is a prediction based approach, it is able to handle both linear subsampling as well as non-linear subsampling based mask decomposition. Therefore, the present invention provides a unified and generic scalable shape coding framework for all the cases including those cases needed in MPEG-4. This alternative two-pass approach can be referred to as "1-2-4" (or One-Two-Four) prediction-based scalable shape coding. Additionally, an advantage of this method is that it can support different decomposition filters in horizontal and vertical directions and will operate for block-based coding as well.

First Pass: Coding Half-Higher Spatial Layer $\Lambda_{n+\frac{1}{2}}$ from Lower Spatial Layer $\Lambda_{n+1}$ In the first pass, two pixels in each 1×2 (one pixel in the horizontal direction and two pixels in the vertical direction) non-overlapped subblock in the raster-scan order in the half-higher spatial layer that is marked "To-Be-Coded" (e.g., corresponding to a BORDER block), are coded separately. More specifically, the two pixels $m^{n+\frac{1}{2}}_{(2i)(j)}$ and $m^{n+\frac{1}{2}}_{(2i+1)(j)}$, where i and j are row and column indices to which this 1×2 subblock corresponds in the lower spatial layer $\Lambda_{n+1}$ are coded separately using the context based arithmetic coding schemes described below.

Figure 14:
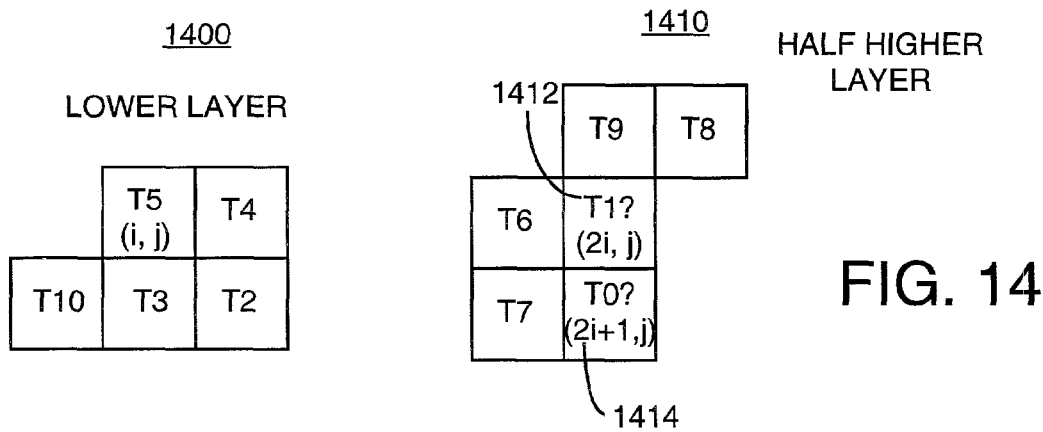
FIG. 14 illustrates a block diagram of the relative positions of context elements for a first pass enhancement layer coding.

FIG. 14 illustrates a block diagram of the relative positions of context elements for enhancement layer coding. Namely, FIG. 14 illustrates the related pixels and their labels used in the context based arithmetic coding from a lower spatial layer 1400 to a half-higher spatial layer 1410. The related pixels and their labels are as follows: where $T_9=m^{n+\frac{1}{2}}_{(2i-1)(j)}$, $T_8=m^{n+\frac{1}{2}}_{(2i-1)(j+1)}$, $T_7=m^{n+\frac{1}{2}}_{(2i+1)(j-1)}$, $T_6=m^{n+\frac{1}{2}}_{(2i)(j-1)}$, $T_5=m^{n+1}_{(i)(j)}$, $T_4=m^{n+1}_{(i)(j+1)}$, $T_3=m^{n+1}_{(i+1)(j)}$, $T_2=m^{n+1}_{(i+1)(j+1)}$, $T_{10}=m^{n+1}_{(i+1)(j-1)}$, $T_1=m^{n+\frac{1}{2}}_{(2i)(j)}$, $T_0=m^{n+\frac{1}{2}}_{(2i+1)(j)}$, and where $m^z_{(x)(y)}$ denotes the mask value at position (x, y) in spatial layer $\Lambda_z$. $T_6$ through $T_9$ are the corresponding already encoded/decoded pixels in the half-higher spatial layer $\Lambda_{n+\frac{1}{2}}$, and $T_5$ through $T_2$ and $T_{10}$ are corresponding pixels in the lower spatial layer $\Lambda_{n+1}$ (1400). $T_1$ (1412) and $T_0$ (1414), are the pixels to be coded in the half-higher spatial layer $\Lambda_{n+\frac{1}{2}}$ (1410).

Figure 15:
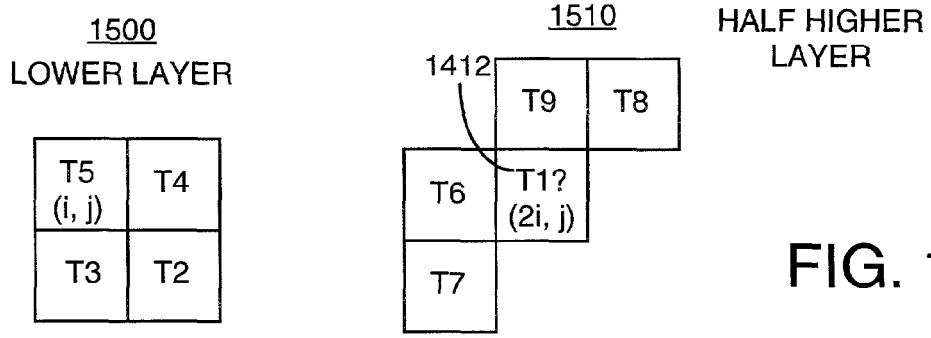
FIG. 15 illustrates a block diagram of the relative positions of context elements in enhancement layer coding for encoding a first pixel in the half-higher spatial layer.

FIG. 15 illustrates a block diagram of the relative positions of context elements in enhancement layer coding for encoding a first pixel 1412 in the half-higher spatial layer 1510. Namely, FIG. 15 illustrates the context used for encoding the pixel $T_1 = m^{n+1/2}{}_{(2i)(j)}$, i.e., where the question mark indicates the pixel whose mask value is to be encoded as follows:

$$\text{Context}_3 = (T_9 <<7) | (T_8 <<6) | (T_7 <<5) | (T_6 <<4) | (T_5 <<3) | (T_4 <<2) | (T_3 <<1) | (T_2) \quad (5)$$

Table A-II(a) and Table A-II(b) in the Appendix provide the context based probability tables for $T_1$ corresponding to odd-symmetric wavelet filter and even symmetric wavelet filter, respectively.

Figure 16:
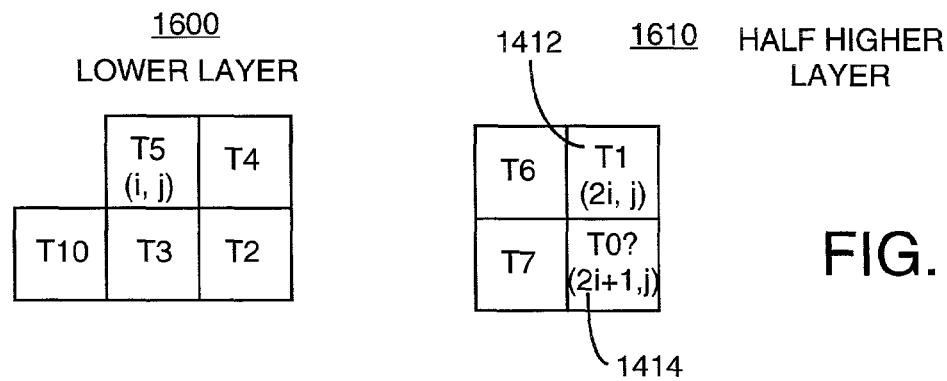
FIG. 16 illustrates a block diagram of the relative positions of context elements in enhancement layer coding for encoding a second pixel in the half-higher spatial layer.

FIG. 16 illustrates a block diagram of the relative positions of context elements in enhancement layer coding for encoding a second pixel 1414 in the half-higher spatial layer 1610. Namely, FIG. 16 illustrates the context used for encoding the pixel $T_0 = m^{n+1/2}{}_{(2i+1)(j)}$, i.e., where the question mark indicates the pixel whose mask value is to be encoded as follows:

$$\text{Context}_4 = (T_1 <<7) | (T_{10} <<6) | (T_7 <<5) | (T_6 <<4) | (T_5 <<3) | (T_4 <<2) | (T_3 <<1) | (T_2) \quad (6)$$

It should be noted that in FIG. 16 the pixel $T_1$ is no longer illustrated with a "?" since its value is now known. Table A-III(a) and Table A-III(b) in the Appendix provide the context based probability tables for $T_0$ corresponding to odd-symmetric wavelet filter and even symmetric wavelet filter, respectively.

Second Pass: Coding Current Spatial Layer $\Lambda_n$ from Half-Higher Layer $\Lambda_{n+1/2}$ The second pass can be achieved by transposing both the half-higher layer and the current mask layer and applying the same procedure of the first pass to encode the current layer mask. Alternatively, the second pass coding can be implemented with no transposing of mask. The two pixels in each 2×1 (two pixels in the horizontal direction and one pixel in the vertical direction) non-overlapped subblock in the vertical-first raster-scan order (that is, the subblocks are scanned in vertical direction first from top to bottom) in the current spatial layer that is marked "To-Be-Coded" (e.g., corresponding to a BORDER block), are coded separately. More specifically, the two pixels $m^n{}_{(i)(2j)}$ and $m^n{}_{(i)(2j+1)}$, where i and j are row and column indices to which this 2×1 subblock corresponds in the half-higher spatial layer $\Lambda_{n+1/2}$ are coded separately using the context based arithmetic coding schemes described below.

FIG. 17 illustrates a block diagram of the relative positions of context elements for a second pass enhancement layer coding. Namely, FIG. 17 illustrates the related pixels and their labels used in the context based arithmetic coding from a half-higher spatial layer 1700 to a current spatial layer 1710. The related pixels and their labels are as follows: where $T_9 = m^n{}_{(i)(2j-1)}$, $T_8 = m^n{}_{(i+1)(2j-1)}$, $T_7 = m^n{}_{(i-1)(2j+1)}$, $T_6 = m^n{}_{(i-1)(2j)}$, $T_5 = m^{n+1/2}{}_{(i)(j)}$, $T_4 = m^{n+1/2}{}_{(i+1)(j)}$, $T_3 = m^{n+1/2}{}_{(i)(j+1)}$, $T_2 = m^{n+1/2}{}_{(i+1)(j+1)}$, $T_{10} = m^{n+1/2}{}_{(i)(j+1)}$, $T_1 = m^n{}_{(i)(2j)}$, $T_0 = m^n{}_{(i)(2j+1)}$, and where $m^z{}_{(x)(y)}$ denotes the mask value at position (x, y) in spatial layer $\Lambda_z$. $T_6$ through $T_9$ are the corresponding already encoded/decoded pixels in a current layer and $T_5$ through $T_2$, and $T_{10}$ are corresponding pixels in the half-higher spatial layer $\Lambda_{n+1/2}$ (1700). $T_1$ (1712) and $T_0$ (1714), are the pixels to be coded in the current spatial layer $\Lambda_{n+1/2}$ (1710).

FIG. 18 illustrates a block diagram of the relative positions of context elements in enhancement layer coding for encoding a first pixel 1712 in the current spatial layer 1810. Namely, FIG. 18 illustrates the context used for encoding the pixel $T_1 = m^n{}_{(i)(2j)}$, i.e., where the question mark indicates the pixel whose mask value is to be encoded as follows:

$$\text{Context}_5 = (T_9 <<7) | (T_8 <<6) | (T_7 <<5) | (T_6 <<4) | (T_5 <<3) | (T_4 <<2) | (T_3 <<1) | (T_2) \quad (7)$$

Table A-II(a) and Table A-II(b) in Appendix give the context based probability tables for $T_1$ corresponding to odd-symmetric wavelet filter and even symmetric wavelet filter, respectively.

FIG. 19 illustrates a block diagram of the relative positions of context elements in enhancement layer coding for encoding a second pixel 1714 in the current spatial layer 1910. Namely, FIG. 19 illustrates the context used for encoding the pixel $T_0 = m^n{}_{(i)(2j+1)}$, i.e., where the question mark indicates the pixel whose mask value is to be encoded as follows:

$$\text{Context}_6 = (T_1 <<7) | (T_{10} <<6) | (T_7 <<5) | (T_6 <<4) | (T_5 <<3) | (T_4 <<2) | (T_3 <<1) | (T_2) \quad (8)$$

Again, it should be noted that in FIG. 19 the pixel $T_1$ is no longer illustrated with a "?" since its value is now known. Table A-III(a) and Table A-III(b) in Appendix give the context based probability tables for $T_0$ corresponding to odd-symmetric wavelet filter and even symmetric wavelet filter, respectively.

It should be noted that in the above contexts, mask values from lower spatial layer $\Lambda_{n+1}$ and half-higher spatial layer $\Lambda_{n+1/2}$ are used in the construction of the context, where the implicit prediction occurs. Again, for those context elements that are outside of the layer's boundary, zeros are used instead to form the context.

It should be noted that all the probability tables in the Appendix give the probability of zeros under given contexts. Namely, the probability tables are normalized to within range [0, 65536]. However, there are three special cases:

1) Probability of zero under certain context is zero. This means that under that context, it is certain that the coded value can only be one. No bits need to be encoded.
2) Probability of zero under certain context is 65536. This means that under that context it is certain that the coded value can only be zero. No bits need to be encoded.
3) Probability of zero under certain context is 65537. This means that this specific context can never occur. Namely, coding based on such a context is an error of the encoder.

Alternatively, the user can also choose to encode the whole shape in a non-scalable manner. In this case, there is no requirement for a one-to-one correspondence between shape decomposition and texture decomposition. This is a special case of the above method where the shape decomposition level L is set to 0, and there is no enhanced layer coding.

Furthermore, the above frame-based shape coding scheme can be easily extended to block-based coding since the contexts used support such block-based coding. When contexts element at block boundaries are not available, the mask values at the corresponding positions in the predicting layers can be used instead.

Binary Arithmetic Enhancement Layer Coding

In order to simplify the scalable shape coder 1211, binary arithmetic encoding is typically preferred. Specifically, the 2×2 coding group in the enhancement layer is divided into individual pixels. In the present invention, several embodiments of simplified binary context models are described. In these methods, the four pixels in a 2×2 block in the enhancement layer are still scanned at the same time. However, when each 2×2 block is scanned, each of the four pixels is coded separately using different context models. Let denote the 2×2 pixels by its spatial location: A(2i, 2j), A(2i, 2j+1), A(2i+1, 2j), A(2i+1, 2j+1). The following context based binary arithmetic coding methods can also be applied to achieve the same high coding efficiency as described above.

First Binary Embodiment

The difference in this binary arithmetic coding embodiment is that the above context-based arithmetic encoding is changed to a binary representation instead of a multi-symbol representation in coding the enhanced layer. The context construction is similar to that described above in FIG. 9, but now the 2×2 block in the enhancement mask layer is not grouped into a symbol and the pixels in the 2×2 block are coded one by one using a progressive context. The contexts for each of the 2×2 pixels are shown in FIG. 20 to FIG. 23.

FIG. 20 illustrates a block diagram of the relative positions of context elements for enhancement layer coding using a binary context model for a first pixel $A(2i,2j)$ 2012 in the first binary embodiment. Specifically, FIG. 20 illustrates the context construction, where the pixel 2012 with the question mark indicates the pixel in current spatial layer $\Lambda_n$ 2010 whose mask value is to be encoded. Namely, FIG. 20 illustrates the construction of this context from both the lower spatial layer $\Lambda_{n+1}$ 2000 and from a current spatial layer $\Lambda_n$ 2010. The context number used by $A(2i, 2j)$ as shown in FIG. 20 can be given as follows:

$$\text{Context}_7 = (T_7 <<7) | (T_6 <<6) | (T_5 <<5) | (T_4 <<4) | (T_3 <<3) | (T_2 <<2) | (T_1 <<1) | T_0 \qquad (9)$$

where "<<" is a left-shift operation and "|" is a bitwise logical OR operation, $T_7 = m''_{(2i-1)(2j)}$, $T_6 = m''_{(2i-1)(2j+1)}$, $T_5 = m''_{(2i)(2j-1)}$, $T_4 = m''_{(2i+1)(2j-1)}$, $T_3 = m^{n+1}_{(i)(j)}$, $T_2 = m^{n+1}_{(i)(j+1)}$, $T_1 = m^{n+1}_{(i+1)(j)}$, $T_0 = m^{n+1}_{(i+1)(j+1)}$, $m''_{(x)(y)}$ denotes the mask value at position (x,y) in spatial layer $\Lambda_n$, 2010.

FIG. 21 illustrates a block diagram of the relative positions of context elements for enhancement layer coding using a binary context model for a second pixel $A(2i,2j+1)$ 2112 in the first binary embodiment. Specifically, FIG. 21 illustrates the context construction, where the pixel 2112 with the question mark indicates the next pixel in the current spatial layer $\Lambda_n$ 2110 whose mask value is to be encoded. Namely, FIG. 21 illustrates the construction of this context from both the lower spatial layer $\Lambda_{n+1}$ 2100 and from a current spatial layer $\Lambda_n$ 2110. The context number used by $A(2i, 2j+1)$ as shown in FIG. 21 can be given as follows:

$$\text{Context}_8 = (T_8 <<8) | (T_7 <<7) | (T_6 <<6) | (T_5 <<5) | (T_4 <<4) | (T_3 <<3) | (T_2 <<2) | (T_1 <<1) | T_0 \qquad (10)$$

where "<<" is a left-shift operation and "|" is a bitwise logical OR operation, $T_8 = m''_{(2i)(2j)}$, $T_7 = m''_{(2i-1)(2j)}$, $T_6 = m''_{(2i-1)(2j+1)}$, $T_5 = m''_{(2i)(2j-1)}$, $T_4 = m''_{(2i+1)(2j-1)}$, $T_3 = m^{n+1}_{(i)(j)}$, $T_2 = m^{n+1}_{(i)(j+1)}$, $T_1 = m^{n+1}_{(i+1)(j)}$, $T_0 = m^{n+1}_{(i+1)(j+1)}$, $m''_{(x)(y)}$ denotes the mask value at position (x,y) in spatial layer $\Lambda_n$, 2110.

FIG. 22 illustrates a block diagram of the relative positions of context elements for enhancement layer coding using a binary context model for a third pixel $A(2i+1,2j)$ 2212 in the first binary embodiment. Specifically, FIG. 22 illustrates the context construction, where the pixel 2212 with the question mark indicates the next pixel in the current spatial layer $\Lambda_n$ 2210 whose mask value is to be encoded. Namely, FIG. 22 illustrates the construction of this context from both the lower spatial layer $\Lambda_{n+1}$ 2200 and from a current spatial layer $\Lambda_n$ 2210. The context number used by $A(2i+1, 2j)$ as shown in FIG. 22 can be given as follows:

$$\text{Context}_9 = (T_9 <<9) | (T_8 <<8) | (T_7 <<7) | (T_6 <<6) | (T_5 <<5) | (T_4 <<4) | (T_3 <<3) | (T_2 <<2) | (T_1 <<1) < T_0 \qquad (11)$$

where "<<" is a left-shift operation and "|" is a bitwise logical OR operation, $T_9 = m''_{(2i)(2j+1)}$, $T_8 = m''_{(2i)(2j)}$, $T_7 = m''_{(2i-1)(2j)}$, $T_6 = m''_{(2i-1)(2j+1)}$, $T_5 = m''_{(2i)(2j-1)}$, $T_4 = m''_{(2i+1)(2j-1)}$, $T_3 = m^{n+1}_{(i)(j)}$, $T_2 = m^{n+1}_{(i)(j+1)}$, $T_1 = m^{n+1}_{(i+1)(j)}$, $T_0 = m^{n+1}_{(i+1)(j+1)}$, $m''_{(x)(y)}$ denotes the mask value at position (x,y) in spatial layer $\Lambda_n$, 2210.

FIG. 23 illustrates a block diagram of the relative positions of context elements for enhancement layer coding using a binary context model for a fourth pixel $A(2i+1,2j+1)$ 2312 in the first binary embodiment. Specifically, FIG. 23 illustrates the context construction, where the pixel 2312 with the question mark indicates the next pixel in the current spatial layer $\Lambda_n$ 2310 whose mask value is to be encoded. Namely, FIG. 23 illustrates the construction of this context from both the lower spatial layer $\Lambda_{n+1}$ 2300 and from a current spatial layer $\Lambda_n$ 2310. The context number used by $A(2i+1, 2j+1)$ as shown in FIG. 23 can be given as follows:

$$\text{Context}_{10} = (T_{10} <<10) | (T_9 <<9) | (T_8 <<8) | (T_7 <<7) | (T_6 <<6) | (T_5 <<5) | (T_4 <<4) | (T_3 <<3) | (T_2 <<2) | (T_1 <<1) | T_0 \qquad (12)$$

where "<<" is a left-shift operation and "|" is a bitwise logical OR operation, $T_{10} = m''_{(2i+1)(2j)}$, $T_9 = m''_{(2i)(2j+1)}$, $T_8 = m''_{(2i)(2j)}$, $T_7 = m''_{(2i)(2i)}$, $T_6 = m''_{(2i-1)(2j+1)}$, $T_5 = m''_{(2i)(2j-1)}$, $T_4 = m''_{(2i+1)(2j-1)}$, $T_3 = m^{n+1}_{(i)(j)}$, $T_2 = m^{n+1}_{(i)(j+1)}$, $T_1 = m^{n+1}_{(i+1)(j)}$, $T_0 = m^{n+1}_{(i+1)(j+1)}$, $m''_{(x)(y)}$ denotes the mask value at position (x,y) in spatial layer $\Lambda_n$, 2310.

Second Binary Embodiment

Figure 24:
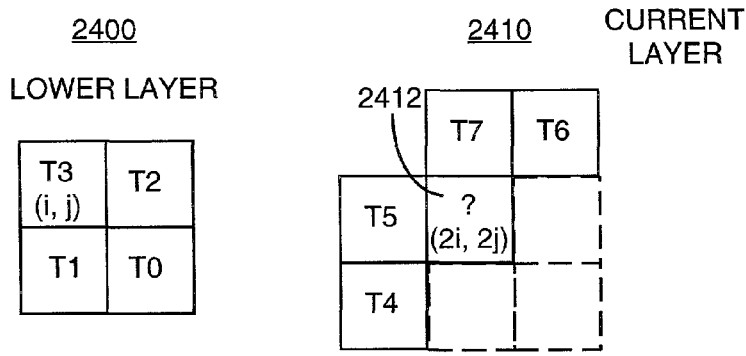
FIG. 24 illustrates a block diagram of the relative positions of context elements for enhancement layer coding using a second binary context model for a first pixel $A(2i,2j)$.

The second binary embodiment is similar to the above first binary embodiment, except the contexts are simplified by taking advantage of less correlation between certain pixels. Specifically, FIG. 24 illustrates a block diagram of the relative positions of context elements for enhancement layer coding using a binary context model for a first pixel $A(2i,2j)$ 2412 in the second binary embodiment. Specifically, FIG. 24 illustrates the context construction, where the pixel 2412 with the question mark indicates the pixel in current spatial layer $\Lambda_n$ 2410 whose mask value is to be encoded. Namely, FIG. 24 illustrates the construction of this context from both the lower spatial layer $\Lambda_{n+1}$ 2400 and from a current spatial layer $\Lambda_n$ 2410. The context number used by $A(2i, 2j)$ as shown in FIG. 24 can be given as follows:

$$\text{Context}_{11} = (T_7 <<7) | (T_6 <<6) | (T_5 <<5) | (T_4 <<4) | (T_3 <<3) | (T_2 <<2) | (T_1 <<1) | T_0 \qquad (13)$$

where "<<" is a left-shift operation and "|" is a bitwise logical OR operation, $T_7 = m''_{(2i-1)(2j)}$, $T_6 = m''_{(2i-1)(2j+1)}$, $T_5 = m''_{(2i)(2j-1)}$, $T_4 = m''_{(2i+1)(2j-1)}$, $T_3 = m^{n+1}_{(i)(j)}$, $T_2 = m^{n+1}_{(i)(j+1)}$, $T_1 = m^{n+1}_{(i+1)(j)}$, $T_0 = m^{n+1}_{(i+1)(j+1)}$, $m''_{(x)(y)}$ denotes the mask value at position (x,y) in spatial layer $\Lambda_n$, 2410. This context is identical to that of equation (9).

Figure 25:
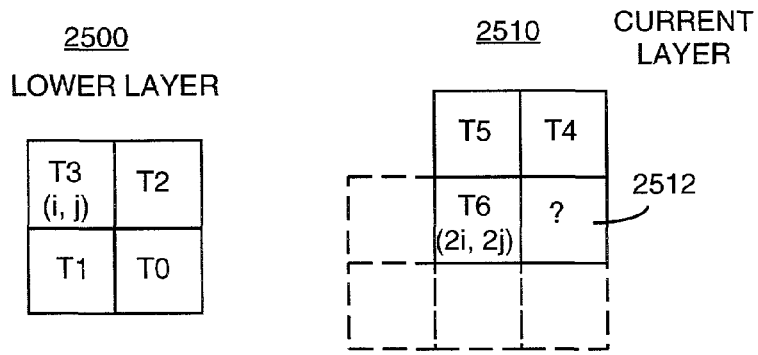
FIG. 25 illustrates a block diagram of the relative positions of context elements for enhancement layer coding using a second binary context model for a second pixel $A(2i,2j+1)$.

FIG. 25 illustrates a block diagram of the relative positions of context elements for enhancement layer coding using a binary context model for a second pixel $A(2i,2j+1)$ 2112 in the second binary embodiment. Specifically, FIG. 25 illustrates the context construction, where the pixel 2512 with the question mark indicates the next pixel in the current spatial layer $\Lambda_n$ 2510 whose mask value is to be encoded. Namely, FIG. 25 illustrates the construction of this context from both the lower spatial layer $\Lambda_{n+1}$ 2500 and from a current spatial layer $\Lambda_n$ 2510. The context number used by $A(2i, 2j+1)$ as shown in FIG. 25 can be given as follows:

$$\text{Context}_{12} = (T_6 <<6) | (T_5 <<5) | (T_4 <<4) | (T_3 <<3) | (T_2 <<2) | (T_1 <<1) | T_0 \qquad (14)$$

where "<<" is a left-shift operation and "|" is a bitwise logical OR operation, $T_6=m^n_{(2i)(2j)}$, $T_5=m^n_{(2i-1)(2j)}$, $T_4=m^n_{(2i-1)(2j+1)}$, $T_3=m^{n+1}_{(i)(j)}$, $T_2=m^{n+1}_{(i)(j+1)}$, $T_1=m^{n+1}_{(i+1)(j)}$, $T_0=m^{n+1}_{(i+1)(j+1)}$, $m^n_{(x)(y)}$ denotes the mask value at position (x,y) in spatial layer $\Lambda_n$, 2510.

Figure 26:
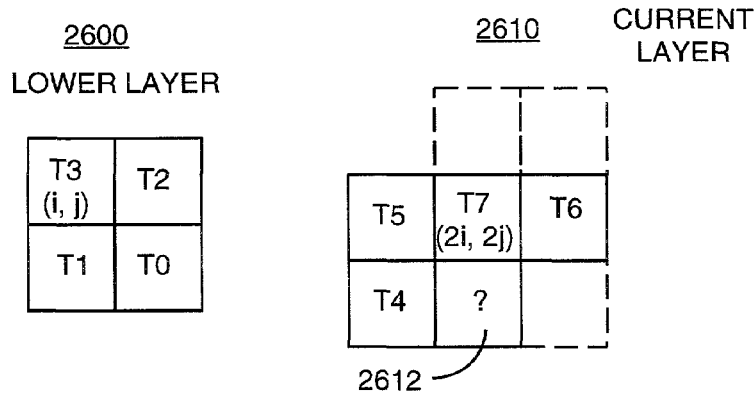
FIG. 26 illustrates a block diagram of the relative positions of context elements for enhancement layer coding using a second binary context model for a third pixel $A(2i+1,2j)$.

FIG. 26 illustrates a block diagram of the relative positions of context elements for enhancement layer coding using a binary context model for a third pixel A(2i+1,2j) 2612 in the second binary embodiment. Specifically, FIG. 26 illustrates the context construction, where the pixel 2612 with the question mark indicates the next pixel in the current spatial layer $\Lambda_n$ 2610 whose mask value is to be encoded. Namely, FIG. 26 illustrates the construction of this context from both the lower spatial layer $\Lambda_{n+1}$ 2600 and from a current spatial layer $\Lambda_n$ 2610. The context number used by A(2i+1, 2j) as shown in FIG. 26 can be given as follows:

$$\text{Context}_{13}=(T_7<<7)|(T_6<<6)|(T_5<<5)|(T_4<<4)| \\ (T_3<<3)|(T_2<<2)|(T_1<<1)|T_0 \quad (15)$$

where "<<" is a left-shift operation and "|" is a bitwise logical OR operation, $T_7=m^n_{(2i)(2j)}$, $T_6=m^n_{(2i)(2j+1)}$, $T_5=m^n_{(2i)(2j-1)}$, $T_4=m^n_{(2i+1)(2j-1)}$, $T_3=m^{n+1}_{(i)(j)}$, $T_2=m^{n+1}_{(i)(j+1)}$, $T_1=m^{n+1}_{(i+1)(j)}$, $T_0=m^{n+1}_{(i+1)(j+1)}$, $m^n_{(x)(y)}$ denotes the mask value at position (x,y) in spatial layer $\Lambda_n$, 2610.

Figure 27:
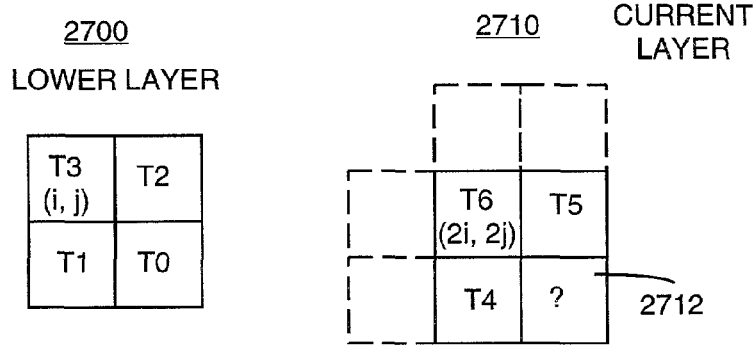
FIG. 27 illustrates a block diagram of the relative positions of context elements for enhancement layer coding using a second binary context model for a fourth pixel $A(2i+1,2j+1)$.

FIG. 27 illustrates a block diagram of the relative positions of context elements for enhancement layer coding using a binary context model for a fourth pixel A(2i+1,2j+1) 2712 in the second binary embodiment. Specifically, FIG. 27 illustrates the context construction, where the pixel 2712 with the question mark indicates the next pixel in the current spatial layer $\Lambda_n$ 2710 whose mask value is to be encoded. Namely, FIG. 27 illustrates the construction of this context from both the lower spatial layer $\Lambda_{n+1}$ 2700 and from a current spatial layer $\Lambda_n$ 2710. The context number used by A(2i+1, 2j+1) as shown in FIG. 27 can be given as follows:

$$\text{Context}_{14}=(T_6<<6)|(T_5<<5)|(T_4<<4)|(T_3<<3)| \\ (T_2<<2)|(T_1<<1)|T_0 \quad (16)$$

where "<<" is a left-shift operation and "|" is a bitwise logical OR operation, $T_6=m^n_{(2i)(2j)}$, $T_5=m^n_{(2i)(2j+1)}$, $T_4=m^n_{(2i+1)(2j)}$, $T_3=m^{n+1}_{(i)(j)}$, $T_2=m^{n+1}_{(i)(j+1)}$, $T_1=m^{n+1}_{(i+1)(j)}$, $T_0=m^{n+1}_{(i+1)(j+1)}$, $m^n_{(x)(y)}$ denotes the mask value at position (x,y) in spatial layer $\Lambda_n$, 2710.

Third Binary Embodiment

The third binary embodiment is similar to the above second binary embodiment, except the contexts are further simplified because of less correlation between certain pixels. Additionally, this third binary embodiment can take advantage of the symmetric feature of the shape decomposition methods in the horizontal and vertical directions.

Figure 28:
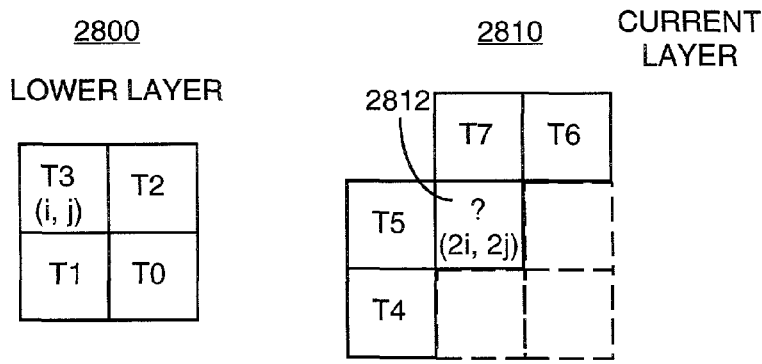
FIG. 28 illustrates a block diagram of the relative positions of context elements for enhancement layer coding using a third binary context model for a first pixel $A(2i,2j)$.

Specifically, FIG. 28 illustrates a block diagram of the relative positions of context elements for enhancement layer coding using a binary context model for a first pixel A(2i,2j) 2812 in the third binary embodiment. Specifically, FIG. 28 illustrates the context construction, where the pixel 2812 with the question mark indicates the pixel in current spatial layer $\Lambda_n$ 2810 whose mask value is to be encoded. Namely, FIG. 28 illustrates the construction of this context from both the lower spatial layer $\Lambda_{n+1}$ 2800 and from a current spatial layer $\Lambda_n$ 2810. The context number used by A(2i, 2j) as shown in FIG. 28 can be given as follows:

$$\text{Context}_{15}=\text{if }(T_1>T_2),$$

$$\text{then }((T_7<<7)|(T_6<<6)|(T_5<<5)|(T_4<<4)|(T_3<<3)| \\ (T_2<<2)|(T_1<<1)|T_0);$$

$$\text{else }((T_5<<7)|(T_4<<6)|(T_7<<5)|(T_6<<4)|(T_3<<3)| \\ (T_1<<2)|(T_2<<1)|T_0) \quad (17)$$

where "<<" is a left-shift operation and "|" is a bitwise logical OR operation, $T_7=m^n_{(2i-1)(2j)}$, $T_6=m^n_{(2i)(2j+1)}$, $T_5=m^n_{(2i)(2j-1)}$, $T_4=m^n_{(2i+1)(2j-1)}$, $T_3=m^{n+1}_{(i)(j)}$, $T_2=m^{n+1}_{(i)(j+1)}$, $T_1=m^{n+1}_{(i+1)(j)}$, $T_0=m^{n+1}_{(i+1)(j+1)}$, $m^n_{(x)(y)}$ denotes the mask value at position (x,y) in spatial layer $\Lambda_n$, 2810. This context is identical to that of equation (9). It should be noted that the symmetric property is used to reduce the total possible context numbers to 192.

Figure 29:
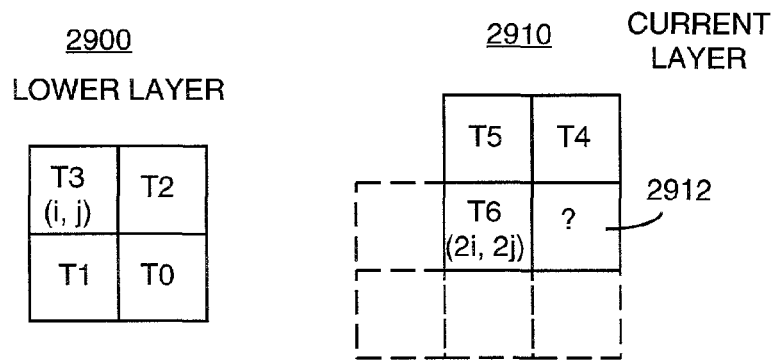
FIG. 29 illustrates a block diagram of the relative positions of context elements for enhancement layer coding using a third binary context model for a second pixel $A(2i,2j+1)$.

FIG. 29 illustrates a block diagram of the relative positions of context elements for enhancement layer coding using a binary context model for a second pixel A(2i,2j+1) 2912 in the third binary embodiment. Specifically, FIG. 29 illustrates the context construction, where the pixel 2912 with the question mark indicates the next pixel in the current spatial layer $\Lambda_n$ 2910 whose mask value is to be encoded. Namely, FIG. 29 illustrates the construction of this context from both the lower spatial layer $\Lambda_{n+1}$ 2900 and from a current spatial layer $\Lambda_n$ 2910. The context number used by A(2i, 2j+1) as shown in FIG. 29 can be given as follows:

$$\text{Context}_{16}=(T_6<<6)|(T_5<<5)|(T_4<<4)|(T_3<<3)| \\ (T_2<<2)|(T_1<<1)|T_0 \quad (18)$$

where "<<" is a left-shift operation and "|" is a bitwise logical OR operation, $T_6=m^n_{(2i)(2j)}$, $T_5=m^n_{(2i-1)(2j)}$, $T_4=m^n_{(2i-1)(2j+1)}$, $T_3=m^{n+1}_{(i)(j)}$, $T_2=m^{n+1}_{(i)(j+1)}$, $T_1=m^{n+1}_{(i+1)(j)}$, $T_0=m^{n+1}_{(i+1)(j+1)}$, $m^n_{(x)(y)}$ denotes the mask value at position (x,y) in spatial layer $\Lambda_n$, 2910.

Figure 30:
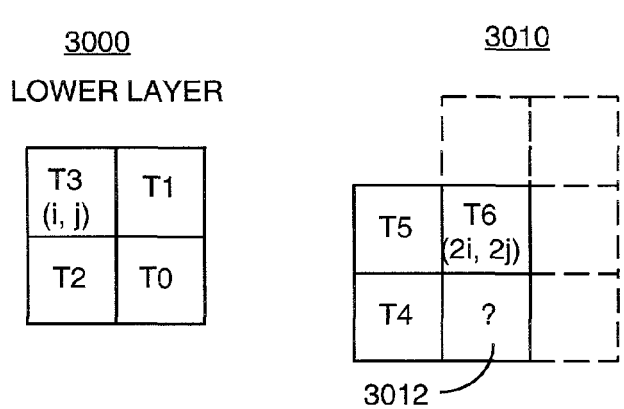
FIG. 30 illustrates a block diagram of the relative positions of context elements for enhancement layer coding using a third binary context model for a third pixel $A(2i+1,2j)$.

FIG. 30 illustrates a block diagram of the relative positions of context elements for enhancement layer coding using a binary context model for a third pixel A(2i+1,2j) 3012 in the third binary embodiment. Specifically, FIG. 30 illustrates the context construction, where the pixel 3012 with the question mark indicates the next pixel in the current spatial layer $\Lambda_n$ 3010 whose mask value is to be encoded. Namely, FIG. 30 illustrates the construction of this context from both the lower spatial layer $\Lambda_{n+1}$ 3000 and from a current spatial layer $\Lambda_n$ 3010. The context number used by A(2i+1, 2j) as shown in FIG. 30 can be given as follows:

$$\text{Context}_{17}=(T_6<<6)|(T_5<<5)|(T_4<<4)|(T_3<<3)| \\ (T_2<<2)|(T_1<<1)|T_0 \quad (19)$$

where "<<" is a left-shift operation and "|" is a bitwise logical OR operation, $T_6=m^n_{(2i)(2j)}$, $T_5=m^n_{(2i)(2j-1)}$, $T_4=m^n_{(2i+1)(2j-1)}$, $T_3=m^{n+1}_{(i)(j)}$, $T_2=m^{n+1}_{(i+1)(j)}$, $T_1=m^{n+1}_{(i)(j+1)}$, $T_0=m^{n+1}_{(i+1)(j+1)}$, $m^n_{(x)(y)}$ denotes the mask value at position (x,y) in spatial layer $\Lambda_n$, 3010. It should be noted that due to the symmetric property, A(2i,2j+1) and A(2i+1, 2j) share the same context probability model but the formation of the contexts are different as shown in FIGS. 29 and 30.

Figure 31:
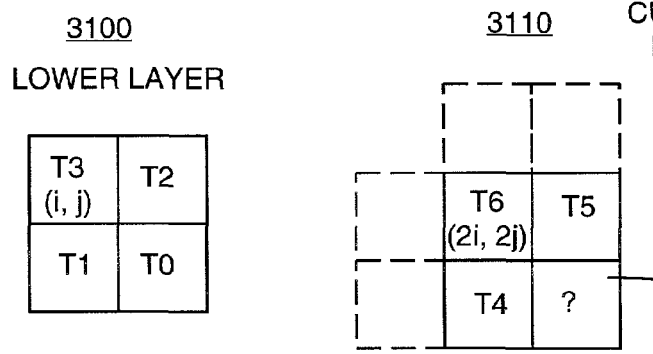
FIG. 31 illustrates a block diagram of the relative positions of context elements for enhancement layer coding using a third binary context model for a fourth pixel $A(2i+1,2j+1)$.

FIG. 31 illustrates a block diagram of the relative positions of context elements for enhancement layer coding using a binary context model for a fourth pixel A(2i+1,2j+1) 2712 in the third binary embodiment. Specifically, FIG. 31 illustrates the context construction, where the pixel 3112 with the question mark indicates the next pixel in the current spatial layer $\Lambda_n$ 3110 whose mask value is to be encoded. Namely, FIG. 31 illustrates the construction of this context from both the lower spatial layer $\Lambda_{n+1}$ 3100 and from a current spatial layer $\Lambda_n$ 3110. The context number used by A(2i+1, 2j+1) as shown in FIG. 31 can be given as follows:

$$\text{Context}_{18}=\text{if }(T_1>T_2)$$

$$\text{then }((T_6<<6)|(T_5<<5)|(T_4<<4)|(T_3<<3)|(T_2<<2)| \\ (T_1<<1)|T_0);$$

$$\text{else }((T_6<<6)|(T_4<<5)|(T_5<<4)|(T_3<<3)|(T_1<<2)| \\ (T_2<<1)|T_0) \quad (20)$$

where "<<" is a left-shift operation and "|" is a bitwise logical OR operation, $T_6=m''_{(2i)(2j)}$, $T_5=m''_{(2i)(2j+1)}$, $T_4=m''_{(2i+1)(2j)}$, $T_3=m^{n+1}_{(i)(j)}$, $T_2=m^{n+1}_{(i)(j+1)}$, $T_{1=m}^{n+1}_{(i+1)(j)}$, $T_0=m^{n+1}_{(i+1)(j+1)}$, $m''_{(x)(y)}$ denotes the mask value at position (x,y) in spatial layer $\Lambda_n$, 3110. It should be noted that the symmetric property is used to reduce the total possible context numbers to 96.

The above binary arithmetic coding embodiments offer flexibility and provide backward compatibility. Namely, the block mode coding can use the same VLC (Variable Length Coding) table as the binary shape coding method as described in MPEG-4 to provide full backward compatibility up to the base-layer. The base layer coding method uses the same coding scheme as the binary context-based arithmetic coding in the current version of the MPEG-4 standard, but without the block boundary (i.e. frame based coding). If no scalability function is required, then the base layer shape coding method resembles the binary context-based arithmetic coding with block boundary removed for frame based wavelet coding. Therefore the present coding method provides full backward compatibility with the current version of the MPEG-4 standard, while providing additional functionalities and higher coding efficiency However, if the VLC table is used to code the block mode, the mode coding efficiency may not be as efficient as using the context-based arithmetic methods proposed in the present invention. Therefore, a single bit in the bitstream can be used to indicate to the decoder whether full-backward compatibility is chosen using VLC table to code the block mode or one of the context-based coding method is employed as described in the present invention. It should be noted that some degree of compatibility is still maintained even if context-based coding method is selected to gain the benefit of higher coding efficiency. Namely the binary context-based arithmetic encoder/decoder and the context used for mode coding and base layer coding are still the same as in the current version of the MPEG-4 standard.

Returning to FIG. 11, after step 1170 is completed, method 1100 returns to step 1165 and the loop formed by steps 1165 and 1170 is repeated until the highest mask layer is encoded.

The above description provides the encoding process of this spatially-scalable shape coder. However, it should be understood that a complementary as decoding process will follow the same steps except that after decoding the block mode, all blocks marked "ALL-0" will be filled with zeros (0's) and all blocks marked "ALL-1" will be filled with ones (1's) in order to form the correct context discussed above. An important aspect of the present invention is that the decoder can stop at any layer to retrieve the mask information for that spatial layer without receiving all the bits for the full-resolution mask layer. Thus, the present invention provides a flexible spatial scalable shape encoding method and apparatus.

A second advantage is that different mask decomposition schemes will likely have different probabilities of distribution within each context, and the present scalable shape coder can be easily switched from one mask decomposition scheme to the other by changing the probability tables used by the arithmetic coder without changing the entire coding method.

Furthermore, it should be noted that in some cases, values of $V''$ may never appear within certain context for certain mask decomposition scheme. This can also be exploited to improve the coding efficiency. Namely, no bits will be spent to encode that pixel value, since it can be uniquely recovered from the context.

Although various embodiments which incorporate the teachings of the present invention have been shown and described in detail herein, those skilled in the art can readily devise many other varied embodiments that still incorporate these teachings.

APPENDIX

Table A-I

The Probability Table for Class and Type in Block Mode Coding (a) Class
USInt Probclass[81]={
63791, 51557, 28328, 32768, 32768, 1, 51874, 32768, 4305, 32768, 32768, 32768, 52778, 32768, 65535, 38632, 32768, 32768, 48149, 32768, 1, 8606, 32768, 7842, 37282, 65535, 2146, 32768, 1, 65535, 32768, 32768, 32768, 32768, 32768, 327618, 32768, 61045, 20339, 1, 63788, 31086, 32768, 47382, 6997, 32768, 3408, 5705, 32768, 43931, 9039, 32768, 37682, 4999, 65505, 1111, 50158, 32768, 32768, 32768, 60396, 1, 14855, 32768, 65535, 18725, 1111, 63276, 33309, 1, 56969, 16602, 63, 411, 2601, 33559, 3569, 54228, 25358, 56719, 49771, 22819};
(b) Type
USInt Probtype[81]={
65282, 1, 54161, 32768, 32768, 32768, 65535, 32768, 50972, 32768, 32768, 32768, 1, 32768, 1, 1, 32768, 32768, 65535, 32768, 32768, 15124, 32768, 1, 61950, 1, 8738, 32768, 32768, 65535, 32768, 32768, 32768, 32768, 32768, 32768, 32768, 1, 1, 32768, 1, 1, 32768, 1, 1, 32768, 1170, 64674, 32768, 1, 1, 32768, 1, 30370, 65535, 65535, 65535, 32768, 32768, 32768, 65535, 32768, 65535, 32768, 1, 1, 65535, 1, 1, 32768, 1, 1, 65535, 1, 65150, 65535, 1, 511, 65535, 1, 25362};

Table A-II

The Probability Table for Pixel T1 in Enhanced Layer Coding (a) Odd Symmetric Filter
USInt scal_prob0_odd[256]={
65536, 65536, 65536, 65536, 65536, 65536, 65536, 65536, 25682, 29649, 83, 1096, 28876, 19253, 2320, 292, 65536, 65536, 65536, 65536, 65536, 65536, 65536, 65536, 20597, 40071, 1, 1476, 6971, 9466, 4033, 314, 65536, 65536, 65536, 65536, 65536, 65536, 65536, 65536, 34822, 58944, 1049, 888, 47296, 38677, 478, 14, 65536, 65536, 65536, 65536, 65536, 65536, 65536, 65536, 21384, 35003, 26, 7, 9600, 13044, 44, 1, 65536, 65536, 65536, 65536, 65536, 65536, 65536, 65536, 66, 13653, 1, 1, 25105, 19008, 285, 31, 65536, 65536, 65536, 65536, 65536, 65536, 65536, 65536, 1057, 27888, 1, 2521, 4252, 15367, 1, 751, 65536, 65536, 65536, 65536, 65536, 65536, 65536, 65536, 290, 17476, 1, 1, 8625, 20056, 121, 3, 65536, 655, 36, 65536, 65536, 65536, 65536, 65536, 65536, 1960, 15984, 1, 1, 4747, 16480, 110, 9, 65536, 65536, 65536, 65536, 65536, 65536, 65536, 87, 140, 1, 55, 1205, 1864, 1, 1, 65536, 65536, 65536, 65536, 65536, 65536, 65536, 65536, 549, 2823, 1, 1, 1902, 782, 1285, 130, 65536, 65536, 65536, 65536, 65536, 65536, 65536, 65536, 290, 6665, 1, 1, 15984, 8656, 1, 244, 65536, 65536, 65536, 65536, 65536, 65536, 65536, 65536, 63, 2114, 1, 3, 2138, 1560, 69, 1, 65536, 65536, 65536, 65536, 65536, 65536, 65536, 65536, 1, 3178, 1, 218, 160, 66, 1, 2, 65536, 65536, 65531, 65536, 65536, 65536, 65536, 65536, 35, 7047, 366, 180, 34, 113, 1, 9, 65536, 65536, 65536, 65536, 65536, 65536, 65536, 65536, 837, 15124, 1, 1, 5571, 323(, 1, 2, 65536, 65536, 65536, 65536, 65536, 65536, 65536, 65536, 14, 1538, 1, 14, 31, 115, 1, 1};
(b) Even Symmetric Filter
USInt scal_prob0_even[256]={
65536, 65536, 65536, 65536, 65536, 65536, 65536, 65536, 25542, 38525, 48333, 53517, 26541, 23214, 61559, 59853, 65536, 65536, 65536, 65536, 65536, 65536, 65536, 65536, 7151, 31006, 33480, 29879, 2609, 4142, 16384, 11884, 65536, 65536, 65536, 65536, 65536, 65536, 65536, 65536, 44817, 65535, 56097, 64984, 40735, 47710, 43386, 52046, 65536, 65536, 65536, 65536, 65536, 65536, 65536, 65536, 17545, 29626, 37308, 42263, 4196, 13552, 7199, 7230, 65536, 65536, 65536, 65536, 65536, 65536, 65536, 65536, 1, 1, 1, 39322, 13578, 17416, 29218, 31831, 65536, 65536, 65536, 65536, 65536, 65536, 65536, 65536, 1311, 65535, 32768, 7282, 1, 3048, 25206, 19935, 65536, 65536, 65536, 65536, 65536, 65536, 65536, 65536, 1, 32768, 17873, 61861, 3417, 14895, 4541, 5293, 65536, 65536, 65536, 65536, 65536, 65536, 65536, 65536, 4819, 32768, 39950, 43523, 1148, 4021, 12072, 5436, 65536, 65536, 65536, 65536, 65536, 65536, 65536, 65536, 1, 1, 134, 1, 1, 55, 5461, 28, 1, 65536, 65536, 65536, 65536, 65536, 65536, 65536, 65536, 24, 5243, 590, 1079, 86, 95, 14564, 7159, 65536, 65536, 65536, 65536, 65536, 65536, 65536, 65536, 328, 1, 2564, 14919, 21845, 1, 9362, 15880, 65536, 65536, 65536, 65536, 65536, 65536, 65536, 65536, 43, 362, 150, 1179, 752, 529, 683, 331, 65536, 65536, 65536, 65536, 65536, 65536, 65536, 65536, 1, 1, 700, 862, 25, 24, 1317, 558, 65536, 65536, 65536, 65536, 65536, 65536, 65536, 65536, 1, 1, 1, 172, 2, 4, 793, 342, 65536, 65536, 65536, 65536, 65536, 65536, 65536, 65536, 572, 1, 1928, 43080, 3337, 1680, 1401, 2131, 65536, 65536, 65536, 65536, 65536, 65536, 65536, 65536, 18, 1, 36, 6, 7456, 8, 18, 40, 8};

Table A-III

The Probability Table for Pixel T0 in Enhanced Layer Coding (a) Odd Symmetric Filter
USInt scal_prob1_odd[256]={
65536, 65536, 54236, 62309, 65536, 65536, 39146, 32459, 0, 0, 0, 0, 0, 0, 0, 0, 65536, 65536, 3293, 20806, 65536, 65536, 20132, 22080, 0, 0, 0, 0, 0, 0, 0, 0, 65536, 65536, 62837, 40750, 65536, 65536, 36528, 20960, 0, 0, 0, 0, 0, 0, 0, 0, 65536, 65536, 46875, 21025, 65536, 65536, 35747, 30778, 0, 0, 0, 0, 0, 0, 0, 0, 65536, 65536, 63956, 52735, 65536, 65536, 32974, 6233, 0, 0, 0, 0, 0, 0, 0, 0, 65536, 65536, 39449, 40885, 65536, 65536, 23406, 10898, 0, 0, 0, 0, 0, 0, 0, 0, 65536, 65536, 62156, 12655, 65536, 65536, 23973, 3451, 0, 0, 0, 0, 0, 0, 0, 0, 65536, 65536, 31892, 3756, 65536, 65536, 24045, 14281, 0, 0, 0, 0, 0, 0, 0, 0, 65537, 65537, 65537, 65537, 65537, 65537, 65537, 51966, 33057, 1, 6782, 62238, 32046, 5919, 418, 65537, 65537, 65537, 65537, 65537, 65537, 65537, 64435, 18941, 1224, 7203, 52134, 4674, 6753, 1113, 65537, 65537, 65537, 65537, 65537, 65537, 65537, 65537, 62703, 34133, 16705, 28007, 31477, 15453, 21558, 6073, 65537, 65537, 65537, 65537, 65537, 65537, 65537, 65537, 61951, 29954, 4826, 6481, 12288, 2410, 4466, 228, 65537, 65537, 65537, 65537, 65537, 65537, 65537, 65537, 1789, 23069, 726, 7470, 30386, 26721, 9811, 1446, 65537, 65537, 65537, 65537, 65537, 65537, 65537, 65537, 45333, 28672, 21363, 26870, 41125, 9455, 25752, 12372, 65537, 65537, 65537, 65537, 65537, 65537, 65537, 65537, 46324, 37071, 4994, 5136, 18879, 28687, 9330, 366, 65537, 65537, 65537, 65537, 6553, 7, 65537, 65537, 65537, 65537, 31745, 26116, 346, 397, 2900, 13830, 361, 8};

(b) Even Symmetric Filter
USInt scal_prob1_even[256]={
65536, 65536, 65536, 65536, 65536, 65536, 65536, 0, 0, 0, 0, 0, 0, 0, 65536, 65536, 65536, 65536, 65536, 65536, 65536, 65536, 65536, 65536, 0, 0, 0, 0, 0, 0, 0, 0, 65536, 65536, 65536, 65536, 65536, 0, 0, 0, 0, 0, 0, 0, 0, 65536, 65536, 65536, 65536, 65536, 65536, 65536, 65536, 0, 0, 0, 0, 0, 0, 0, 65536, 65536, 65536, 65536, 65536, 65536, 65536, 65536, 65536, 65536, 0, 0, 0, 0, 0, 0, 0, 65536, 65536, 65536, 65536, 65536, 0, 0, 0, 0, 0, 0, 0, 0, 65536, 65536, 65536, 65536, 65536, 65536, 65536, 65536, 65536, 0, 0, 0, 0, 0, 0, 0, 65536, 65536, 0, 0, 0, 0, 0, 0, 0, 0, 65537, 65537, 65537, 65537, 65537, 65537, 65537, 54018, 8704, 1, 903, 61648, 31196, 327, 575, 65537, 65537, 65537, 65537, 65537, 65537, 65537, 65537, 64400, 36956, 1673, 9758, 52289, 4361, 659, 1433, 65537, 65537, 65537, 65537, 65537, 65537, 65537, 65537, 56482, 65535, 1, 1, 11905, 3034, 1, 1, 65537, 65537, 65537, 65537, 65537, 65537, 65537, 65537, 61103, 56650, 925, 8814, 11845, 2075, 828, 223, 65537, 65537, 65537, 65537, 65537, 65537, 65537, 65537, 4161, 1, 494, 5041, 52508, 32195, 11005, 2463, 65537, 65537, 65537, 65537, 65537, 65537, 65537, 65537, 63286, 32768, 39133, 49486, 53351, 8541, 37603, 15011, 65537, 65537, 65537, 65537, 65537, 65537, 65537, 65537, 18805, 13107, 1039, 1214, 5060, 21845, 3830, 387, 65537, 65537, 65537, 65537, 65537, 65537, 65537, 65537, 31654, 32951, 490, 1496, 2535, 11699, 328, 13};

What is claimed is:

1. A method for coding an input object, where said input object mask has a plurality of regions, said method comprising the steps of:
   (a) assigning at least one symbol to each of the plurality of regions, wherein each of the plurality of regions comprises a $2^N \times 2^N$ block of pixels, N is equal to or greater than a desired number of object mask layers, L, and:
      each of the plurality of regions having only pixels with a first mask value is assigned a first symbol,
      each of the plurality of regions having only pixels with a second mask value is assigned a second symbol, said second symbol being different than said first symbol, and
      each of the plurality of regions having pixels with said first mask value and said second mask value is assigned a third symbol, said third symbol being different than said first and said second symbols;
   (b) coding said assigned symbols of the input object mask, wherein each of the plurality of regions assigned said first symbol or said second symbol is assigned to a first class, and each of the plurality of regions assigned said third symbol is assigned to a second class,
   (c) utilizing a first binary probability model to encode each of said first and second classes, and utilizing a second binary probability model to further encode said first class;
   (d) decomposing said input object mask into a plurality of object mask layers of different spatial resolution, wherein each object mask layer is identified as $\Lambda_n$, $0 \leq n \leq L$, $\Lambda_0$ is a full resolution object mask layer, and $\Lambda_L$ is a base object mask layer;
   (e) coding, utilizing an encoder, said base object mask layer $\Lambda_L$, wherein each of said plurality of regions assigned to said second class within said base object mask layer $\Lambda_L$ is encoded in a raster scan order; and
   (f) coding, utilizing said encoder, a next higher layer of said plurality of object mask layers in accordance with information from a lower object mask layer $\Lambda_{n+1}$.

2. The method of claim 1, wherein said coding step (b) codes said assigned symbols contextually in accordance with neighboring regions.

3. The method of claim 2, wherein said coding step (b) codes said assigned symbols contextually in accordance with:

$$\text{Context}_0 = S_3*27 + S_2*9 + S_i*3 + S_0,$$

where $\text{context}_0$ is a context for an assigned symbol for a current region, $M_{ij}$, to be coded, I and j are respectively row index and column index, and wherein said neighboring regions are defined as $S_3 = M_{(i-j)(j-1)}$, $S_2 = M_{(i-1)j}$, $S_1 = M_{(i-j)(j+1)}$, and $S_0 = M_{i(i-1)}$.

4. The method of claim 1, further comprising zero-padding the object mask to form said $2^N \times 2^N$ blocks of pixels when said object mask is not a multiple of $2^N$ pixels.

5. The method of claim 1, wherein said first class of regions comprises a first type and a second type, wherein said first type comprising said regions assigned said first symbol, and said second type comprising said regions assigned said second symbol.

6. The method of claim 1, further comprising proceeding to a next symbol for a next one of said plurality of regions assigned to said second class.

7. A computer-readable medium having stored thereon a plurality of instructions, the plurality of instructions which, when executed by a processor, cause the processor to perform the steps of a method for coding an input object mask, where said input object mask has a plurality of regions, said method comprising the steps of:
(a) assigning at least one symbol to each of the plurality of regions, wherein each of the plurality of regions comprises a $2^N \times 2^N$ block of pixels, N is equal to or greater than a desired number of object mask layers, L, and:
each of the plurality of regions having only pixels with a first mask value is assigned a first symbol,
each of the plurality of regions having only pixels with a second mask value is assigned a second symbol, said second symbol being different than said first symbol, and
each of the plurality of regions having pixels with said first mask value and said second mask value is assigned a third symbol, said third symbol being different than said first and said second symbols;
(b) coding said assigned symbols of the input object mask, wherein each of the plurality of regions assigned said first symbol or said second symbol is assigned to a first class, and each of the plurality of regions assigned said third symbol is assigned to a second class;
(c) utilizing a first binary probability model to encode each of said first and second classes, and utilizing a second binary probability model to further encode said first class;
(d) decomposing said input object mask into a plurality of object mask layers of different spatial resolution, wherein each object mask layer is identified as $\Lambda_n$, $0 \leq n \leq L$, $\Lambda_0$ is a full resolution object mask layer, and $\Lambda_L$ is a base object mask layer;
(e) coding said base object mask layer $\Lambda_L$, wherein each of said plurality of regions assigned to said second class within said base object mask layer $\Lambda_L$ is encoded in a raster scan order; and
(f) coding a next higher layer of said plurality of object mask layers in accordance with information from a lower object mask layer $\Lambda_{n+1}$.

8. The computer-readable medium of claim 7, wherein said coding step (b) codes said assigned symbols contextually in accordance with neighboring regions.

9. The computer-readable medium of claim 8, wherein said coding step (b) codes said assigned symbols contextually in accordance with:

$$\text{Context}_0 = S_3*27 + S_2*9 + S_i*3 + S_0,$$

where $\text{context}_0$ is a context for an assigned symbol for a current region, $M_{ij}$, to be coded, I and j are respectively row index and column index, and wherein said neighboring regions are defined as $S_3 = M_{(i-j)(j-1)}$, $S_2 = M_{(i-1)j}$, $S_1 = M_{(i-j)(j+1)}$, and $S_0 = M_{i(j-1)}$.

10. The computer-readable medium of claim 7, wherein said method further comprises zero-padding the object mask to form said $2^N \times 2^N$ blocks of pixels when said object mask is not a multiple of $2^N$ pixels.

11. The computer-readable medium of claim 7, wherein said first class of regions comprises a first type and a second type, wherein said first type comprising said regions assigned said first symbol, and said second type comprising said regions assigned said second symbol.

12. The computer-readable medium of claim 7, further comprising proceeding to a next symbol for a next one of said plurality of regions assigned to said second class.

13. An apparatus for coding an input object mask, where said input object mask has a plurality of regions, said apparatus comprising:
(a) means for assigning at least one symbol to each of the plurality of regions, wherein each of the plurality of regions comprises a $2^N \times 2^N$ block of pixels, N is equal to or greater than a desired number of object mask layers, L, and:
each of the plurality of regions having only pixels with a first mask value is assigned a first symbol,
each of the plurality of regions having only pixels with a second mask value is assigned a second symbol, said second symbol being different than said first symbol, and
each of the plurality of regions having pixels with said first mask value and said second mask value is assigned a third symbol, said third symbol being different than said first and said second symbols;
(b) a first means for coding said assigned symbols of the input object mask, wherein each of the plurality of regions assigned said first symbol or said second symbol is assigned to a first class, and each of the plurality of regions assigned said third symbol is assigned to a second class;
(c) a first means for encoding each of said of first and second classes, said first means for encoding utilizing a first binary probability model;
(d) a second means for further encoding said first class, said second means for encoding further utilizing a second binary probability model;
(e) means for decomposing said input object mask into a plurality of object mask layers of different spatial resolution, wherein each object mask layer is identified as $\Lambda_n$, $0 \leq n \leq L$, $\Lambda_0$ is a full resolution object mask layer, and $\Lambda_L$ is a base object mask layer;
(f) a second means for coding said base object mask layer $\Lambda_L$ of said plurality of object mask layers, wherein each of said plurality of regions assigned to said second class within said base object mask layer $\Lambda_L$ is encoded in a raster scan order; and
(g) a third means for coding a next higher layer of said plurality of object mask layers in accordance with information from a lower object mask layer $\Lambda_{n+1}$.

14. The apparatus of claim 13, wherein said first coding means codes said assigned symbols contextually in accordance with neighboring regions.

15. The apparatus of claim 14, wherein said coding step (b) codes said assigned symbols contextually in accordance with:

$$Context_0 = S_3*27 + S_2*9 + S_1*3 + S_0,$$

where $context_0$ is a context for an assigned symbol for a current region, $M_{ij}$, to be coded, I and j are respectively row index and column index, and wherein said neighboring regions are defined as $S_3 = M_{(i-j)(j-1)}$, $S_2 = M_{(i-1)j}$, $S_1 = M_{(i-j)(j+1)}$, and $S_0 = M_{i(j-1)}$.

16. The apparatus of claim 13, further comprising a means for zero-padding the object mask to form said $2^N \times 2^N$ blocks of pixels when said object mask is not a multiple of $2^N$ pixels.

17. The apparatus of claim 13, wherein said first class of regions comprises a first type and a second type, said first type comprising said regions assigned said first symbol, and said second type comprising said regions assigned said second symbol.

18. The apparatus of claim 13 further comprising a means for proceeding to a next symbol for a next one of said plurality of regions assigned to said second class.

19. An apparatus for coding an input object mask, where said input object mask has a plurality of regions, each of the plurality of regions comprises a $2^N \times 2^N$ block of pixels, N is equal to or greater than a desired number of object mask layers, L, and said apparatus comprising:
an encoder that:
(a) assigns a first symbol to each of the plurality of regions having only pixels with a first mask value, a second symbol to each of the plurality of regions having only pixels with a second mask value, and a third symbol to each of the plurality of regions having pixels with said first mask value and said second mask value, said second symbol being different than said first symbol, and said third symbol being different than said first and said second symbols;
(b) codes said assigned symbols of the input object mask, wherein each of the plurality of regions assigned said first symbol or said second symbol is assigned to a first class, and each of the plurality of regions assigned said third symbol is assigned to a second class;
(c) encodes each of said first and second classes utilizing a first binary probability model;
(d) further encodes said first class utilizing a second binary probability model;
(e) decomposes said input object mask into a plurality of object mask layers of different spatial resolution, wherein each object mask layer is identified as $\Lambda_n$, $0 \leq n \leq L$, $\Lambda_0$ is a full resolution object mask layer, and $\Lambda_L$ is a base object mask layer;
(f) codes said base object mask layer $\Lambda_L$ of said plurality of object mask layers;
(g) encodes each of said plurality of regions assigned to said second class within said base object mask layer $\Lambda_L$ in a raster scan order; and
(h) codes a next higher layer of said plurality of object mask layers in accordance with information from a lower object mask layer $\Lambda_{n+1}$;
a multiplexer, communicatively coupled to said encoder and configured to produce a transport stream; and
a transmitter, communicatively coupled to said transport stream and configured to transmit to a communication channel.

20. The apparatus of claim 19, wherein said encoder further codes said assigned symbols contextually in accordance with neighboring regions.

21. The apparatus of claim 20, wherein said encoder codes said assigned symbols contextually in accordance with:

$$Context_0 = S_3*27 + S_2*9 + S_i*3 + S_0,$$

where $context_0$ is a context for an assigned symbol for a current region, $M_{ij}$, to be coded, I and j are respectively row index and column index, and wherein said neighboring regions are defined as $S_3 = M_{(i-j)(j-1)}$, $S_2 = M_{(i-1)j}$, $S_1 = M_{(i-j)(j+1)}$, and $S_0 = M_{i(j-1)}$.

22. The apparatus of claim 19, further configured to zero-pad the object mask to form said $2^N \times 2^N$ blocks of pixels when said object mask is not a multiple of $2^N$ pixels.

23. The apparatus of claim 19, wherein said first class of regions comprises a first type and a second type, said first type comprising said regions assigned said first symbol, and said second type comprising said regions assigned said second symbol.

24. The apparatus of claim 19, wherein said encoder proceeds to a next symbol for a next one of said plurality of regions for each mode symbol assigned to said second class.

25. The apparatus of claim 19, further comprising a demultiplexer, communicatively coupled to said communication channel and configured to demultiplex a signal from said communication channel.

26. The apparatus of claim 25, further comprising a decoder, communicatively coupled to said demultiplexer and configured to decode a demultiplexed signal from said communication channel.

* * * * *